US007056176B2

(12) United States Patent
Isaac

(10) Patent No.: US 7,056,176 B2
(45) Date of Patent: Jun. 6, 2006

(54) BUOYANCY MOTOR

(76) Inventor: Felix Isaac, 95 South View Road, Hornsey, London N8 7LX (GB)

( * ) Notice: Subject to any disclaimer, the term of this patent is extended or adjusted under 35 U.S.C. 154(b) by 0 days.

(21) Appl. No.: 11/111,407

(22) Filed: Apr. 21, 2005

(65) Prior Publication Data
US 2005/0186864 A1  Aug. 25, 2005

Related U.S. Application Data

(63) Continuation of application No. PCT/GB03/04512, filed on Oct. 20, 2003.

(30) Foreign Application Priority Data

Oct. 21, 2002 (GB) ................................ 0224464.8
Nov. 4, 2002 (GB) ................................ 0225684.0

(51) Int. Cl.
    *B63B 22/00* (2006.01)

(52) U.S. Cl. ........................................................ 441/1
(58) Field of Classification Search ...................... 441/1
     See application file for complete search history.

(56) References Cited

U.S. PATENT DOCUMENTS

| 2,097,286 | A | * | 10/1937 | McGee .......................... 290/54 |
| 2,730,631 | A | * | 1/1956 | Dandini ......................... 290/54 |
| 4,499,725 | A | | 2/1985 | Sbrizzai .................... 81/176.15 |
| 4,872,805 | A | * | 10/1989 | Horiuchi et al. ................. 415/7 |
| 6,616,403 | B1 | * | 9/2003 | Smith et al. .................. 415/3.1 |

FOREIGN PATENT DOCUMENTS

| FR | 2 717 862 | 9/1995 |
| GB | 2 233 046 | 1/1991 |

OTHER PUBLICATIONS

International Search Report dated Feb. 9, 2004.
A. Ord-Hume, "Perpetual Motion", History of An Obsession, St. Martin's Press, 1977, pp. 100-103.

* cited by examiner

*Primary Examiner*—Stephen Avila
(74) *Attorney, Agent, or Firm*—St. Onge Steward Johnston & Reens LLC

(57) ABSTRACT

The present invention provides for an apparatus utilising the buoyancy upthrust on a floatation member to assist displacement of a moveable article in a non-vertical direction wherein the apparatus comprises at least one pivotally mounted floatation member disposed within a fluid medium and having a displaceable actuator member integrally connected to this floatation member and the floatation member being integrally mounted on the moveable article about an appropriate pivot axis extending therefrom whereby the floatation member is pivotally displaceable about its pivot axis into the fluid medium and past an equilibrium position by application of a pivotal displacement force applied to the actuator member so as to create a resultant buoyancy upthrust on the floatation member, whereby elements and/or components are provided to apply and maintain the pivotal displacement force in the direction perpendicular to this actuator member to thereby create a resultant force vector from the buoyancy upthrust on the floatation member which extends perpendicularly through the pivot axis so as to be transmittable to the article to effect displacement of such article. There is also provided a method of utilising such buoyancy upthrust on a floatation member to effect displacement of a moveable article in a non-vertical direction.

26 Claims, 31 Drawing Sheets

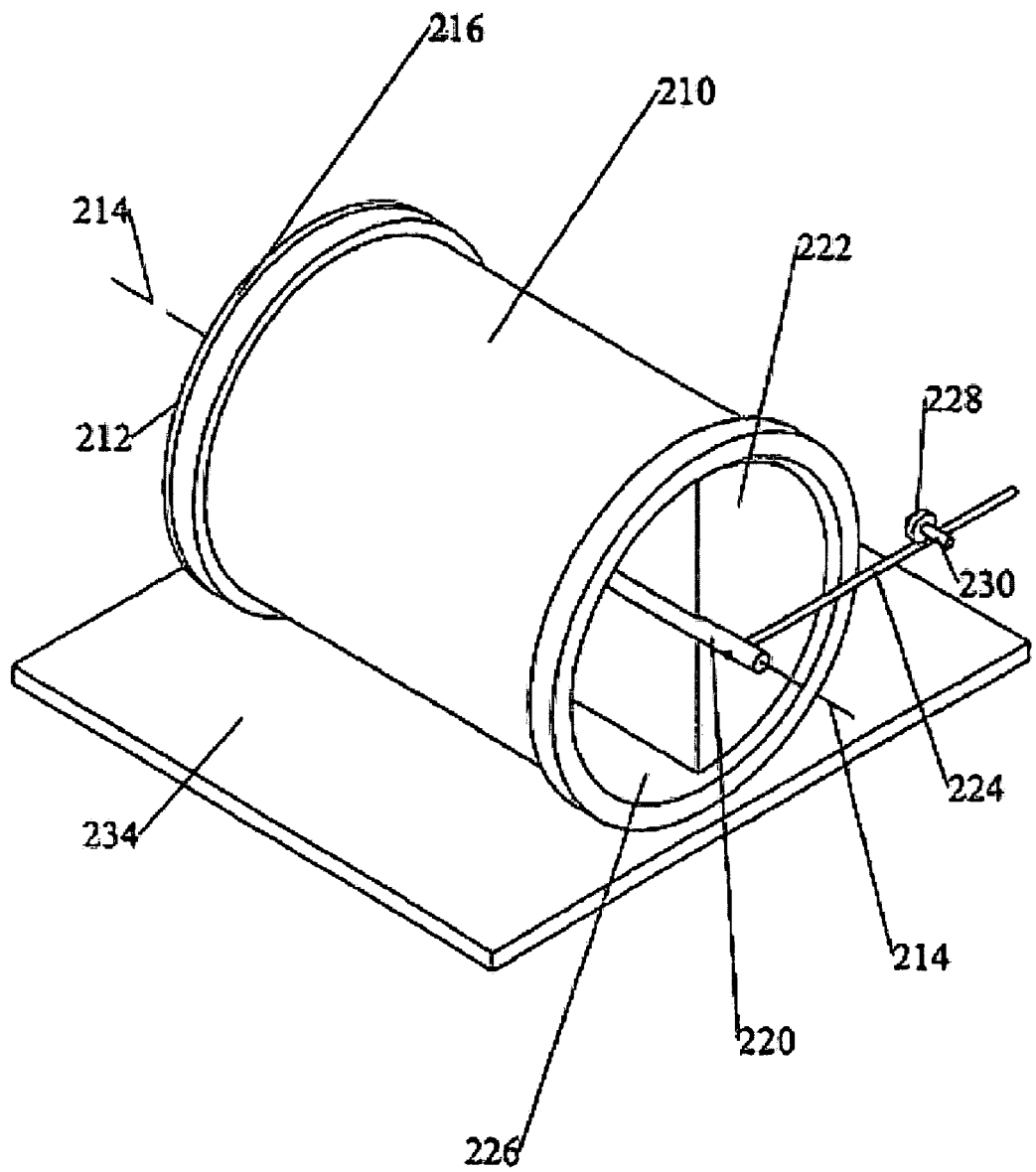

BUOYANCY MOTOR

This application is a continuation of International Patent Application No. PCT/GB03/04512 filed Oct. 20, 2003 which designates the United States and claims priority of Great Britain Application No. 0224464.8 filed Oct. 21, 2002, Great Britain Application No. 0225684.0 filed Nov. 4, 2002 and Great Britain Application No. 0312948.3 filed Jun. 5, 2003.

SUMMARY OF THE INVENTION

The present invention is directed to a force transmitting apparatus and, more particularly, to an apparatus utilising buoyancy upthrust on a floatation member to transmit a displacement force, in a non-vertical direction, to a moveable article. Specifically, this buoyancy upthrust is utilised to effect rotational displacement of the article.

With the increase in population and decreasing natural energy resources, greater emphasis is now being placed on creating more efficient mechanical apparatus in an attempt to conserve current resources. However, it is also recognised that many natural energy resources, such as gravity and solar energy, are currently under exploited. The current invention resides in the determination that an upthrust exerted on a submerged flotation device could be exploited to increase energy efficiency in the displacement of certain articles.

It is well understood that a floating body (or floatation device) such as piece of cork, if held below the surface of water and then released would rise vertically upwards towards the surface. It is understood that the water exerts an upward force on the floatation device and, from Archimedes principle, that the magnitude of the upward force exerted (the upthrust) onto the floatation member is equal to the weight of water which is displaced by the floatation device. The resultant upward force exerted on the floatation device may be considered to operate through the centre of mass of the equivalent volume of displaced water.

It is further understood that a conventional trolley placed on a horizontal surface will remain stationery. However, if the trolley were placed on an inclined surface it would travel along the inclined surface moving in both a vertical and horizontal direction. Here, gravity will be considered to act on the trolley vertically downwards through the centre of mass of the trolley, invoking a reaction force from the inclined surface extending perpendicular to the incline to create a resultant force vector substantially parallel to the incline causing the trolley to move down such incline. The understanding of these basic physics principles has now enabled the applicant to develop apparatus and method of utilising the buoyancy upthrust on a submerged flotation member to drive and displace an article. It is the notion of harnessing the motion or upthrust on a floating body to do work in moving a required article.

It is therefore an object of the present invention to develop an apparatus and method for utilising the buoyancy upthrust on a submerged flotation member to assist non-vertical displacement of an article of such apparatus.

According to the present invention there is now provided an apparatus for utilising the buoyancy upthrust on a floatation member to assist displacement of a moveable article in a non-vertical direction, the apparatus comprising at least one pivotally mounted floatation member at least partially immersed in a fluid medium and a displaceable actuator member integrally connected to the floatation member, wherein the floatation member is integrally mounted on the moveable article about a pivot axis extending therefrom, the floatation member being pivotally displaceable about the pivot axis into the fluid medium and past an equilibrium position by application of a pivotal displacement force applied to the actuator member so as to create a buoyancy upthrust on the floatation member, wherein means are provided to apply and maintain the pivotal displacement force in a direction perpendicular to the actuator member, thereby creating a resultant force vector from the buoyancy upthrust on the floatation member which extends perpendicularly through the pivot axis and is transmittable to the article to effect displacement of such article. Preferably, the apparatus will be enclosed, comprising a sealed body for containing the fluid medium in which the floatation member is at least partially, and usually completely, immersed.

Preferably, the actuator member will be radially remote from the pivot axis so as to achieve an appropriate mechanical advantage through the application of the pivotal displacement force thereto. Utilising the basic principles of levers, the greater the distance from the pivot axis then the smaller the force is required to overcome the natural buoyancy of the floatation member to effect submersion past its equilibrium position. For this reason the actuator member will preferably comprise a lever mechanism, usually in the form of an elongate bar member extending radially way from the pivot axis. This lever mechanism may be coaxially mounted on the floatation member about the pivot axis or may be simply mounted integrally with the floatation member remote from the pivot axis.

Since it is important to maintain the pivotal displacement force perpendicular to the actuator member then the apparatus will preferably comprise a displaceable force transmission member which will usually serve to maintain the pivotal displacement force constant with respect to and perpendicular with the displaceable actuator member during the displacement of the article and usually to maintain the application of the force at a uniform distance from the pivot axis and to maintain the actuator member at a constant pivotal angle about the pivot axis. This force transmission member may either be motor driven or may comprise a manual mechanism. Preferably, the article itself will be rotatable, usually about an axis coaxial with the pivot axis, wherein the article will be displaceable laterally relative to a direction of the buoyancy upthrust. In such embodiment, the article will usually comprise a cylindrical drum encompassing the fluid medium and the floatation device, and which drum extending coaxial with the pivot axis of the flotation member. Alternatively, the article may be rotatable about an article axis perpendicular to the pivot axis and, in such embodiment, the article may have an external drive mechanism connected to and operated by the rotatable article. Such an external drive mechanism may include a toothed wheel for driving a gear mechanism. In the embodiment of an article being rotatable about an axis perpendicular to the pivot axis, it is preferred that the displaceable force transmission member will also extend coaxially with the article axis. Here, it is possible that the apparatus will comprise a plurality of floatation members radially disposed about and pivotally connected to the article axis where it is then preferred that the force transmitting member will comprise a circular device mounted coaxially with the article axis so as to maintain the pivotal displacement force applied to each of the plurality of floatation members constant with respect to and perpendicular with each displaceable actuator member associated therewith.

Further, according to the present invention there is also provided a method of utilising the buoyancy upthrust on a floatation member to assist displacement of a moveable article in a non-vertical direction, comprising the steps of connecting a pivotally displaceable floatation member to the article about a pivot axis of the floatation member, applying a pivotal displacement force to an actuator member of the floatation member in a direction perpendicular to the actuator member so as to effect pivotal displacement of the floatation member past an equilibrium position, maintaining the displacement force perpendicular to the actuator member to create a resultant force vector from the buoyancy upthrust on the floatation member which is transmitted perpendicularly through the pivot axis to the article to effect displacement of such article.

Preferably, this method further comprises providing said actuator with a pre-determined length and wherein the application of the pivotal displacement force is effected remote from the pivot axis at a pre-determined distance from the pivot axis to provide a pre-determined mechanical advantage, allowing a smaller force than the resultant upthrust to effect the displacement of the floatation member past this equilibrium position. Again, this takes advantage of the basic principle of mechanical advantage achieved by use of levers whereby the greater the distance between the pivot axis and the point of application of force necessitates a smaller force to overcome the inherent buoyancy upthrust as the floatation member passes past its equilibrium position. The method also preferably comprises maintaining the pivotal displacement force perpendicular to the actuator member during displacement of the article and will usually provide for maintaining a pivotal displacement force at the pre-determined distance during this displacement of the article.

In addition, it is preferred that the method maintains the pivotal displacement force constant during displacement of the article.

The method may further provide the step of adjusting the resultant force vector transmitted to the article by adjusting the angle between the point of application of the pivotal displacement force to the actuator member relative to a horizontal plane intersecting the pivot axis. This method may also comprise a means of increasing the resultant force vector by increasing the angle relative to the horizontal plane.

The present invention further encompasses a wheeled vehicle having at least one wheel comprising an apparatus as hereinbefore described and is also directed towards an engine comprising an apparatus as hereinbefore described and utilising the moveable article to actuate said engine.

BRIEF DESCRIPTION OF THE DRAWINGS

Two preferred embodiments of the present invention will now be described, by way of example only, and with reference to the accompanying illustrative drawings in which:

FIG. 8 shows the apparatus of FIG. 2 at a second stable configuration.

DETAILED DESCRIPTION OF THE DRAWINGS

Figure 1:
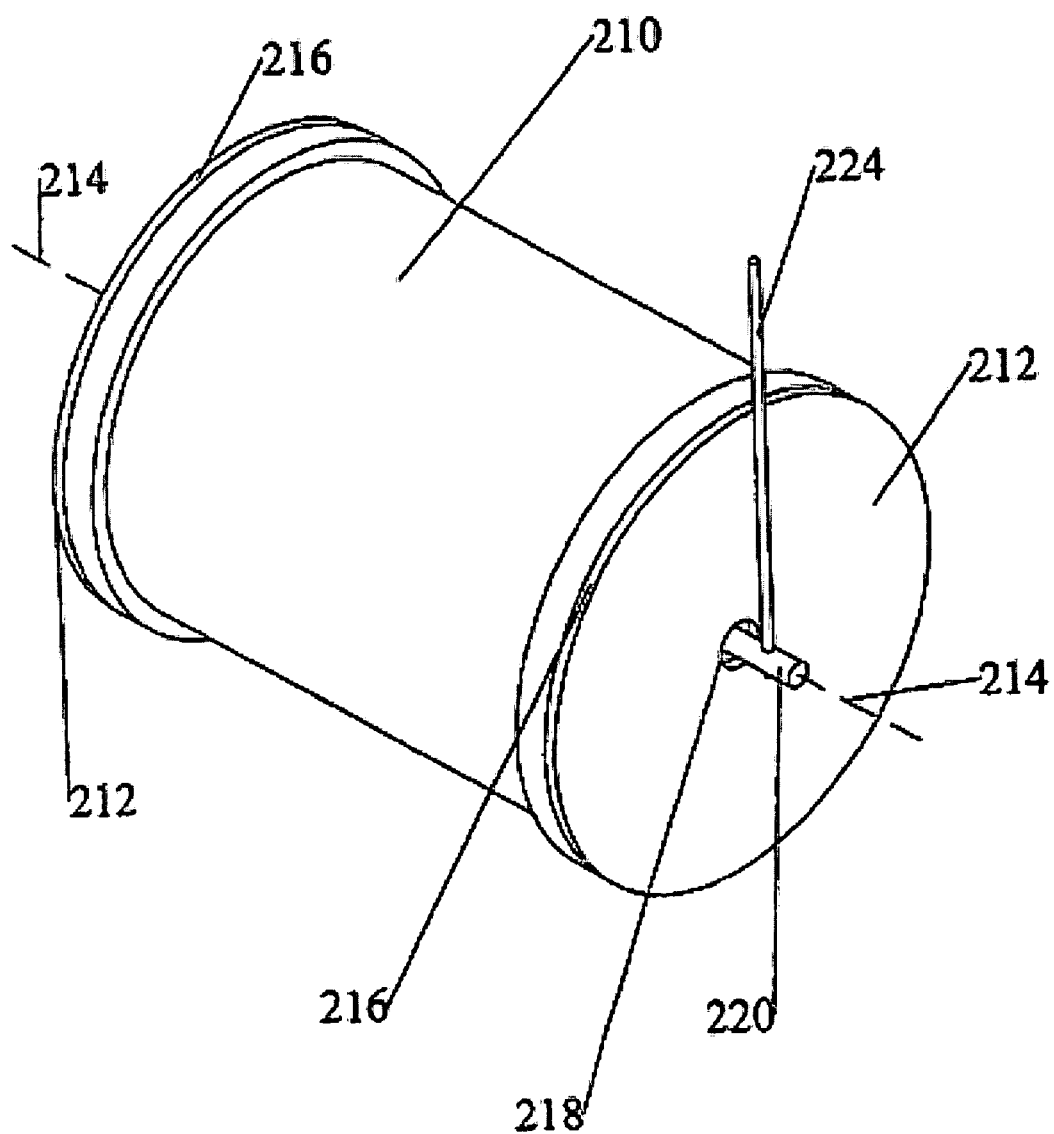
FIG. 1 is a perspective view of a first embodiment of the apparatus according to the present invention in a stable position.

The present invention is directed to both a method and apparatus of utilising the buoyancy upthrust exerted on a floatation member submerged past its normal equilibrium position to act as a driving force to effect non-vertical displacement of articles connected to that floatation member. A first embodiment of the present invention, representing one of the more simple applications of the invention to a practical embodiment, is now illustrated in FIG. 1. FIG. 1 comprises a sealed cylindrical container (210) which will normally be constructed of a rust resistant material such as plastic, aluminium or other coated metal such as stainless steel (since the container will preferably contain water as a liquid medium).

Figure 2:
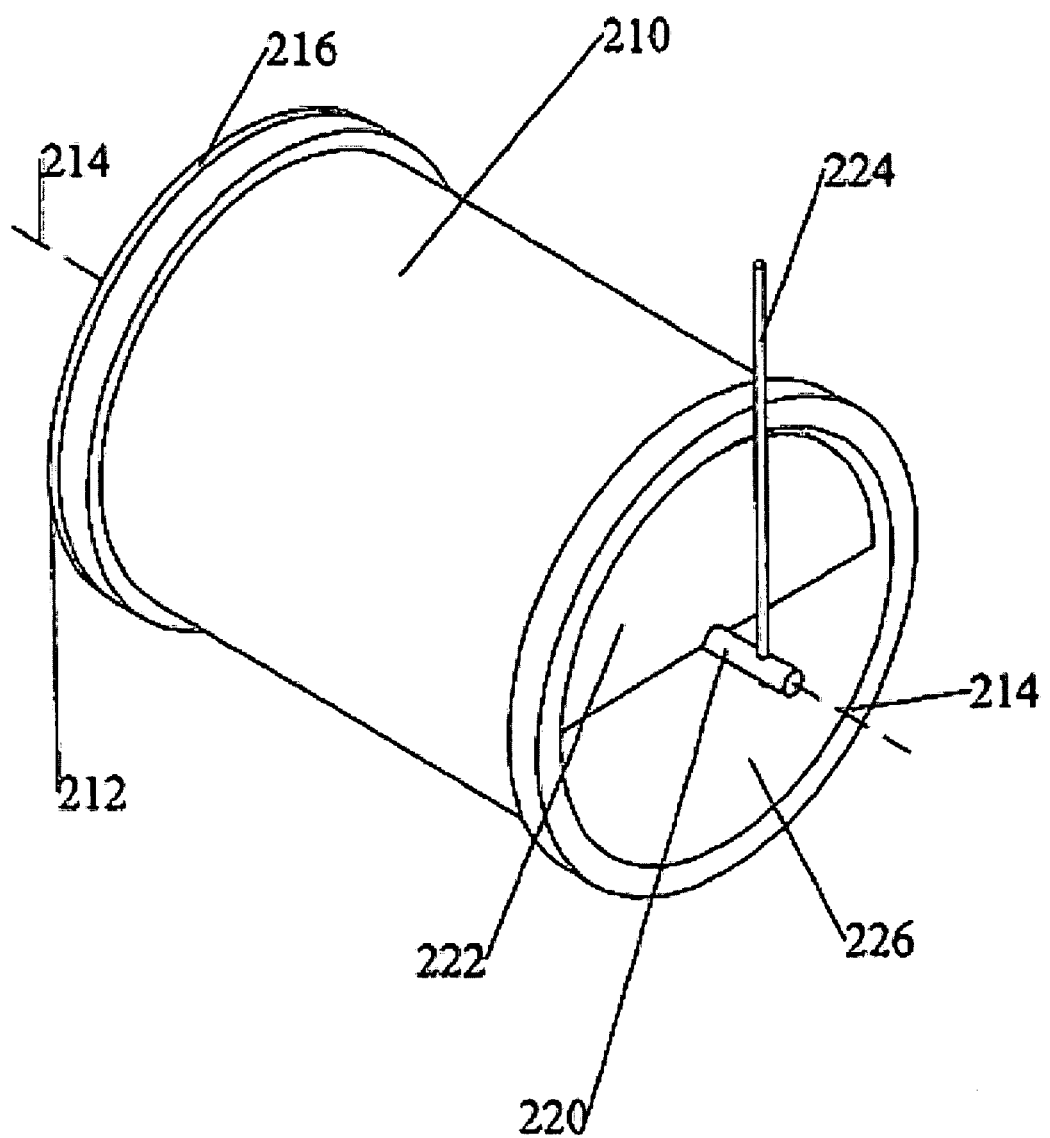
FIG. 2 shows the apparatus of FIG. 1 with an end cover removed to show the internal configuration thereof.

In this embodiment, the cylinder (210) is provided with two circular cover seals or cover plates (212) mounted coaxially with a primary axis (214) of the cylinder. Each of the cover plates (212) are provided with appropriate rims (216) upon which the sealed cylindrical container therefore rests. The cover plates (212) may be integrally sealed about the cylindrical container (210) such as by welding or adhesive bonding or may be removably fixed thereto such as by the use of appropriate bolt members to allow a removal of one or more of the cover plates to permit access to the internal workings of the container. Such bolts are not shown in the Figures. At least one of the cover plates (212) (as shown in FIG. 1) is provided with a central circular aperture (218) extending therethrough and permitting communication with the interior of the cylindrical container (210). This aperture (218) is again mounted so as be concentric with the cylinder axis (214). A substantially cylindrical shaft (220) extends through the circular aperture (218) so as to again extend coaxially about the axis (214) into the interior of the cylinder where it is integrally mounted on a floatation member (222) (as shown in FIG. 2 and as will be described in more detail below). Although not shown in FIG. 1, this shaft (220) is supported by an appropriate sealed bearing again mounted coaxially about axis (214) on the end plate (212) so as to permit relative rotation between the cover plate and the shaft (220) whilst maintaining a fluid seal thereabouts to prevent liquid contained within the container (210) leaking through this aperture (218). Such sealed bearings are well understood in the art and need not be described in any detail herein.

As also shown in FIG. 1, the shaft (220) further comprises an elongate lever member (224) integrally mounted thereon and extending perpendicular thereto. Furthermore, although not shown in the figures the shaft (220) extends coaxially along at least part of the length of the container (210) and is supported on a second internal bearing mechanism, again mounted coaxial with the container axis (214) so that the shaft (220) is freely rotatable within the container but maintained coaxial on the axis (214). Preferably, the shaft (220) will extend the entire length of the container (210) to be mounted on such an internal bearing mounted on the interior surface of the opposed cover plate (212).

Figure 3:
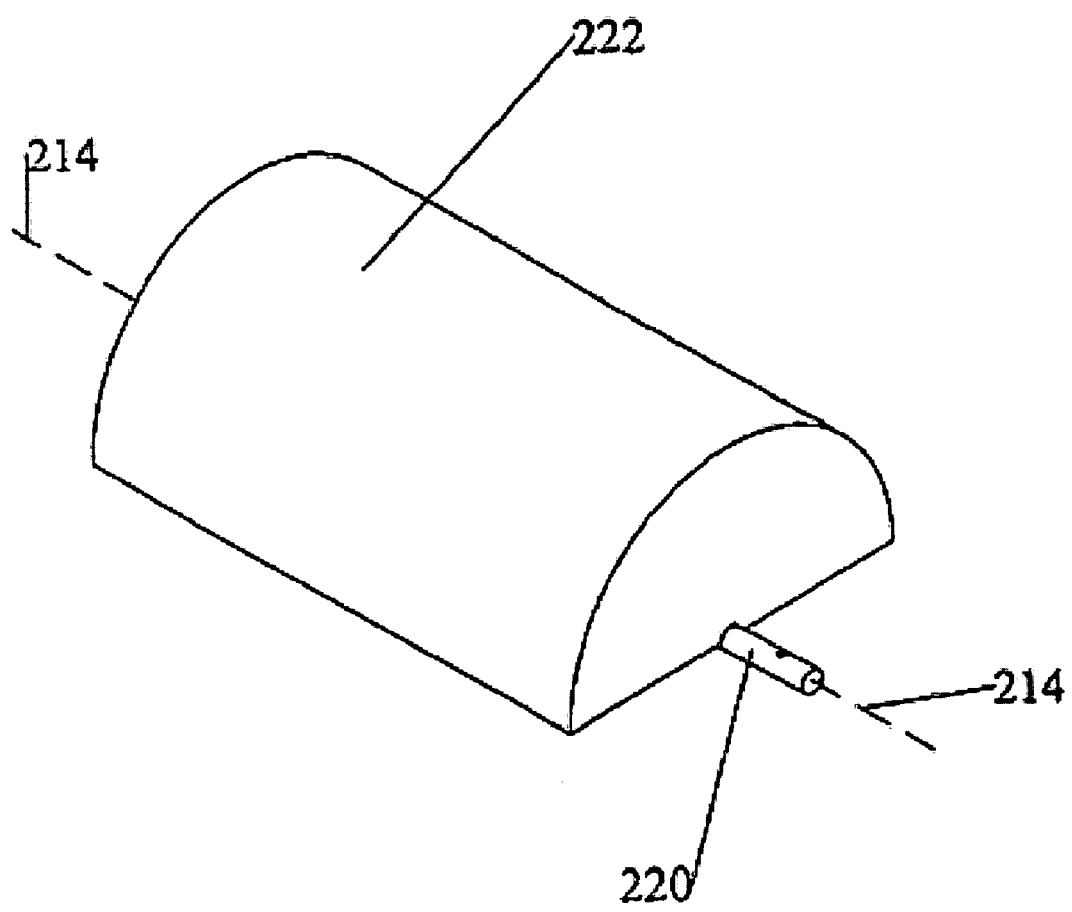
FIG. 3 is a perspective view of the floatation member of the apparatus of FIG. 2.

Referring now to FIG. 2, cover plate (212) has been removed for clarity purposes so as to illustrate the internal configuration of the apparatus of the present invention. Here it is seen that the shaft (220) has integrally mounted thereon (and restrained from rotation about the shaft (220)) a floatation member (222). This floatation member (222), in cross section is substantially hemi-semicircular and is clearly seen in FIG. 3. Furthermore, and again seen in FIG. 3, the floatation member (222) is of a comparable length to the internal length of the container (210) so as to extend the majority of the length of such container (210). This floatation member (222) is effectively a floating body and may either be constructed of a lightweight low density material such as wood, foam, plastic or other material having a density less than water or, may preferably comprise a hollow container made of plastic or rust resistant metals. This floatation member (222) is secured from relative rotation about the shaft (220) by conventional means such as welding thereto or by the use of mechanical restraints such as bolts as will be well understood in the art. The important feature is that the floatation member rotates integrally with the shaft (220). The design of the floatation member (222) shown in the present invention is a single elongate member, but this is merely a preferred design and may in fact comprise a plurality of individual float elements or a smaller float element that only extends partway along the length of the container (210). Also, whilst shown here as having a semi-circular profile this is merely to permit ease of rotation of the floatation member (222) about the interior of the container (210) without engaging such container (210). The semi-circular shape permits the maximum size of floatation member (222) although its profile is non-essential to operation of the current invention.

The container (210) is filled with an appropriate liquid, usually water, although any liquid having a density greater than that of the floatation member (222) can be employed. The water is illustrated by use of the reference numeral (226) in FIG. 2 and will preferably fill the interior of the container (210). The operation function of the apparatus embodied in this cylindrical container (210) will be described with reference to FIGS. 4 through 9.

Firstly, it will be understood that when the container (210) is laying on a substantially horizontal surface the liquid will effectively immerse the floatation member (222) and the contained part of the shaft (220) (the liquid restrained from leaking from the container (210) by the appropriate seals) so that the floatation member will seek an equilibrium position (as shown in FIG. 2) resultant from the upthrust exerted thereon from the fluid. To simplify the understanding of the present invention, the upthrust exerted by the fluid on the floatation member (222) is transferred, via the shaft (220), to each of the covers (212) through the bearings (not shown) mounted thereon, whereby the reaction force on the shaft (220) is equal to the upthrust. Therefore, the embodiment shown in FIGS. 1 and 2 is in a stable configuration since the reaction force is equal to the upthrust acting on the floatation member (222) and is directed in a vertical plane intersecting the point of contact made between the rims (216) of the cover plates (212) and the horizontal surface (234) and the axis (214), leaving the cylinder (210) balanced. In such configuration the cylinder (210) is not disturbed by the upthrust acting on the floatation member (222). In addition, the effect of forces due to the mass of the shaft (220), the floatation member (222) and the lever member (224) are assumed negligible and will be disregarded for the purposes of this explanation.

Figure 4:
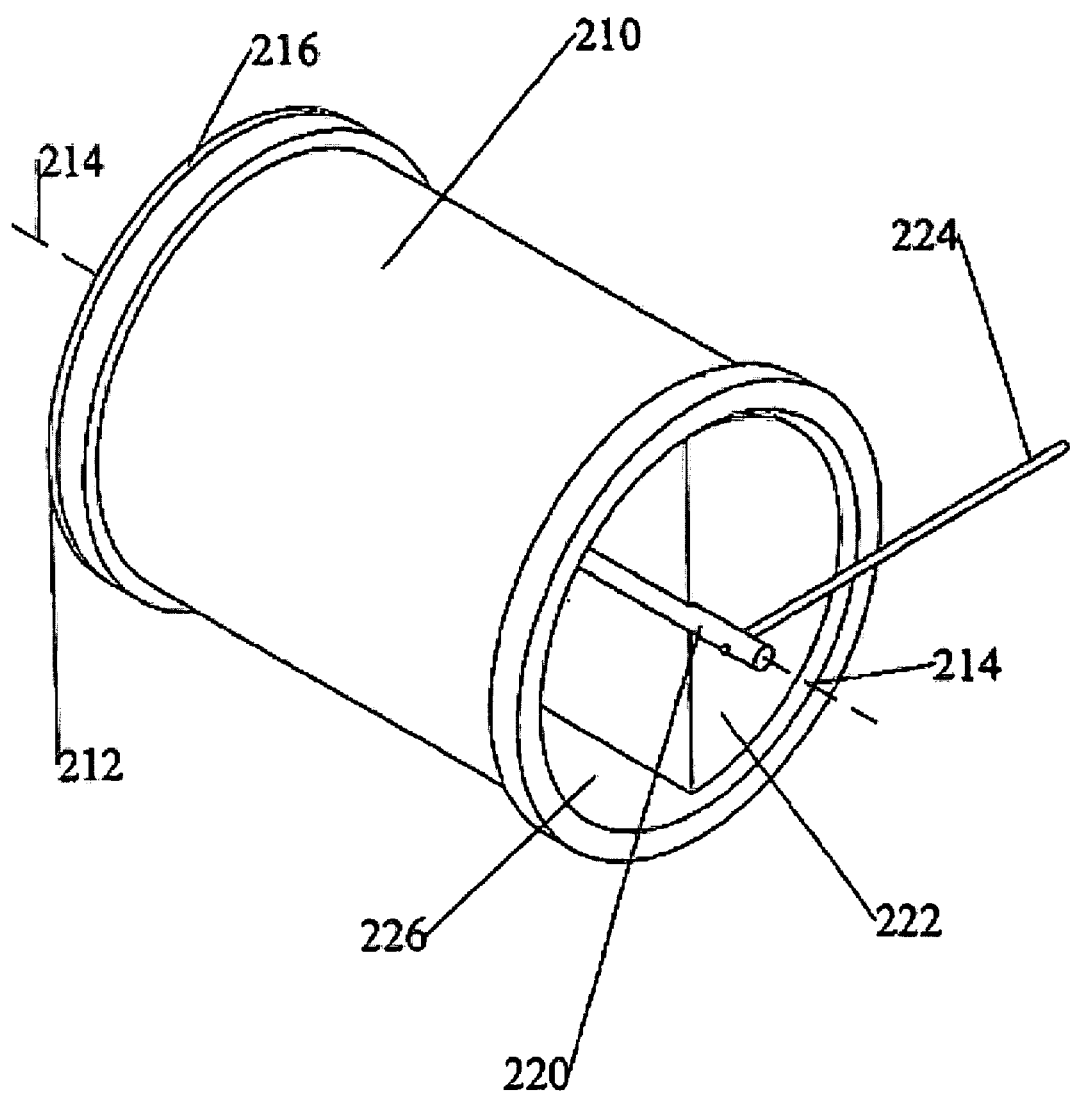
FIG. 4 shows the apparatus of FIG. 2 in an operative position.

However, as shown in FIG. 4, by displacement of the lever (224) about an arcuate path extending coaxial with the axis (214) the shaft (220) is rotated about the axis (214) thereby effecting similar rotational displacement of the floatation member (222) as shown.

Figure 5:
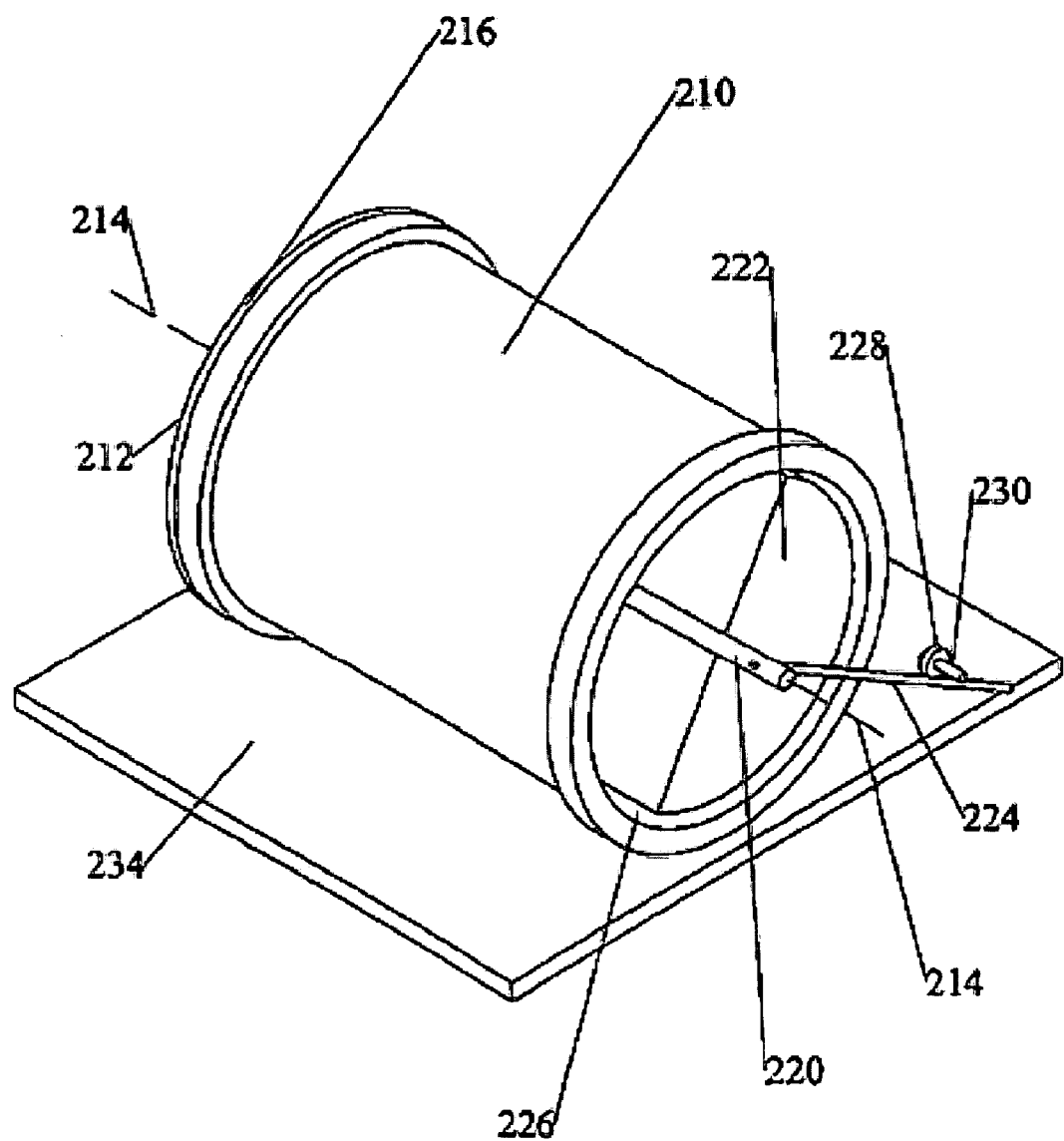
FIG. 5 shows the apparatus of FIG. 2 illustrating the use of a force transmitting member.

As shown in FIG. 5, this pivotal displacement force applied to the lever (224) is, in this embodiment, provided by means of a rotatable wheel (228) mounted coaxially with a cylindrical shaft (230), which shaft (230) having an elongate axis parallel to the axis (214) of the cylinder (210). Since the wheel (228) is freely rotatable about the shaft (230) then its engagement with the lever (224) transfers the pivotal displacement force in a direction perpendicular to the lever (224) as shown substantially in FIG. 6, where the direction of this pivotal displacement force is shown by Arrow (232). Since the lever (224) is connected to the shaft (220) and the shaft (220) is mounted on bearings (not shown) on the cover plates (212), rotation of the lever (224) and subsequently the inherent rotational displacement of the shaft (220) and the floatation member (222) are effected without causing any disturbance (or lateral force) on the cylinder (210). However, since the displacement of the lever (224) has now displaced the floatation member (222) to the position shown in FIGS. 5 and 6 it will be appreciated that the floatation member (222) is no longer in an equilibrium position and is subject to a buoyancy upthrust force which, if the force on the lever (224) was removed would act on the floatation member (222) to return it to the position shown in FIGS. 1 and 2. Again, the movement of the floatation member (222) back to its equilibrium position would be effected by displacement about the cylinder axis (214) and would not have any impact on displacement or movement of the cylinder (210) itself when mounted on a horizontal surface (234).

Figure 6:
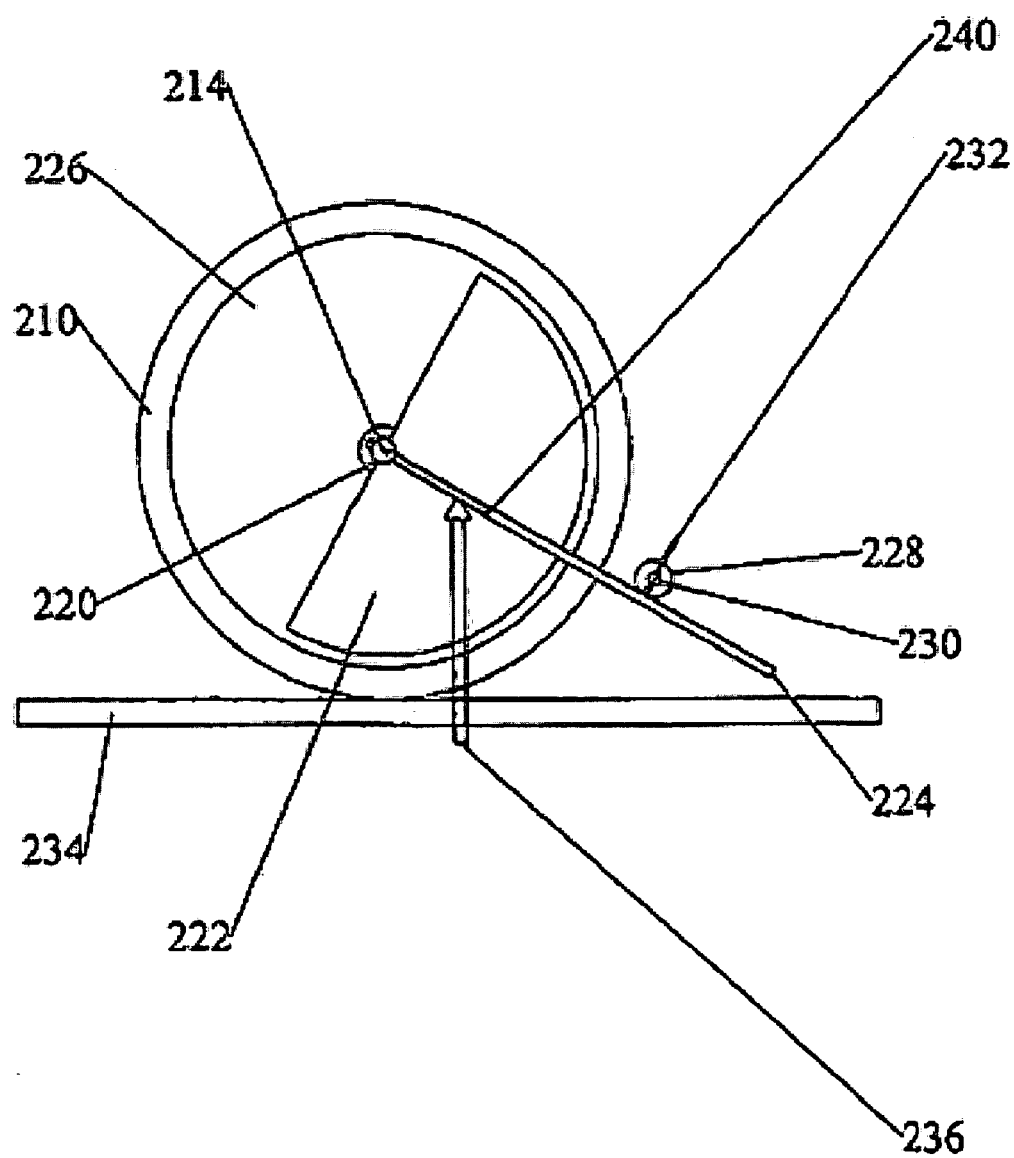
FIG. 6 is a side view of the apparatus shown in FIG. 5 schematically illustrating the forces acting on the apparatus.

However, in the present invention, the pivotal displacement force exerted on the lever (224) is maintained constant by, in this example, a user (not shown) maintaining the displaced lever (224) in a position shown in FIGS. 5 and 6 thereby applying an appropriate force to the wheel (228). Here, the upthrust effected on the floatation member (222) is now represented by the illustrative arrow (236) shown in FIG. 6 as acting on the floatation member (222). The length of this arrow is indicative of the magnitude of the upthrust and the point of the arrow is shown illustratively placed on the lever at the calculated centre of buoyancy of the floatation member (222) in its displaced position. The mass of the displaced fluid or water within the cylinder container (210) is equivalent to this upthrust and represented by the relative length (magnitude) of the arrow (236). This is meant to provide an illustrative view of the inherent upthrust being exerted on the floatation member (222) and hence the lever member (224). It will be appreciated that the magnitude of the pivotal displacement force exerted by the wheel (228) and represented by arrow (232) is considerably less than the magnitude of the upthrust force illustrated by arrow (236). This is due to the distance between the point of application of the force (232) relative to the axis (214) such that the moment exerted by the force (232) is a combination of that force multiplied by the distance from the point of rotation. This is the basic principle of the operation of levers and of moments and need not be described in any great detail here, suffice to say that the magnitude of the force (232) would need to increase as that force was applied at a position close to the axis (214) of rotation of the lever (224) so as to balance the inherent upthrust force (236) and moment created thereby. It will further be appreciated that resolution of the upthrust vector (236) will result in a reaction force (not shown) equal and opposite to the pivotal displacement force exerted in the direction (232) and also a resultant force (240) extending along the lever (224) towards the axis (214). Knowledge of the upthrust vector, the reaction vector and the resultant vector represent a parallelogram whereby the magnitude of the reaction vector and the magnitude of the resultant vector may be calculated if so required. Furthermore, since the resultant vector is not balanced by any other force and that this force is applied in a direction towards the axis (214), through the lever (224) such force will be exerted through the appropriate bearings to the cylinder (210) and thus will impart a lateral force on the cylinder (210) thereby effecting rotational displacement of that cylinder (210) along the horizontal surface (234).

However, in order to maintain such displacement of the cylinder (210) by utilising this buoyancy upthrust force on the displaced floatation member (222), it is essential that the pivotal displacement force (232) is maintained perpendicular to the lever (224) and thus it is appreciated that as the wheel (228) must also be moved so as to maintain the pivotal displacement force perpendicular to this lever (224). In the event that the force (232) was displaced so as to be no longer perpendicular to the lever (224) then it itself would have a resultant lateral component which could balance the resultant force (240) being exerted on the cylinder (210). In the embodiment shown in FIGS. 1 through 6 the pivotal displacement force (232) may be maintained perpendicular to the lever (224) preferably by providing such force with an appropriate mechanism to replicate the displacement of the cylinder (210) and thus maintain the force at a constant distance from the axis (214) whilst maintaining the lever (224) at a constant angle relative to a horizontal plane intersecting the axis (214). This could be achieved simply by a user following the movement of the cylinder (210) or could be automated by providing a mechanical or motorised means for maintaining the appropriate force transmitting member (in this case the wheel (228)) at the desired position relative to the cylinder axis (214) both by means of distance from the cylinder axis (214) and angular configuration relative to the cylinder axis (214), as the cylinder (210) itself is displaced.

Alternatively, in the event of use of a rotatable wheel (228) as described herein, should mounting of that rotatable wheel (228) about its shaft (230) be maintained at a fixed position relative to displacement of the cylinder (210) then, due to the rotational nature of the wheel (228) as the lever (224) moves from right to left following displacement of the cylinder (210) as viewed in FIG. 6, then the angle of the lever (224) relative to a horizontal plane intersecting the axis (214) will decrease as the cylinder (210) moves away therefrom. In this situation, the force being applied to the lever (224) is still maintained perpendicular thereto to allow continued movement. This is reflected in the practical application by seeing the cylindrical container (210) effectively rolling away from this secured wheel (228). This would provide a finite movement of the cylinder (210) since, once the lever has been moved beyond the extent of the position of the wheel (228), there will no longer be a pivotal displacement force exerted on that lever and thus the upthrust will serve to rotate the floatation member (222) back to its equilibrium position at which stage no further resultant force (240) is exerted on the cylinder which will come to a stop.

Figure 7:
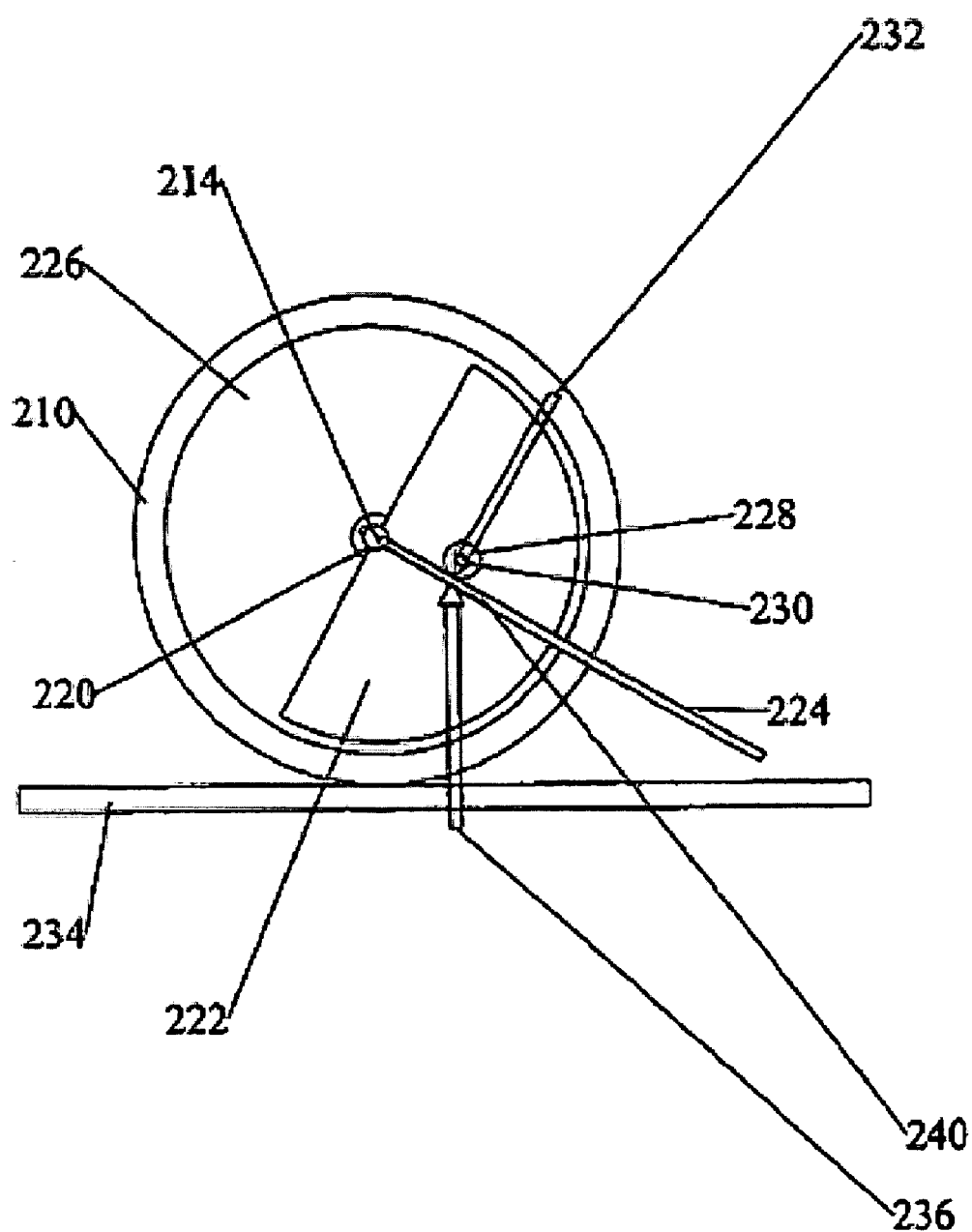
FIG. 7 is a side elevation schematically illustrating the force relationship of the apparatus when an actuating force is applied at a different position to that shown in FIG. 6.
Figure 7A:
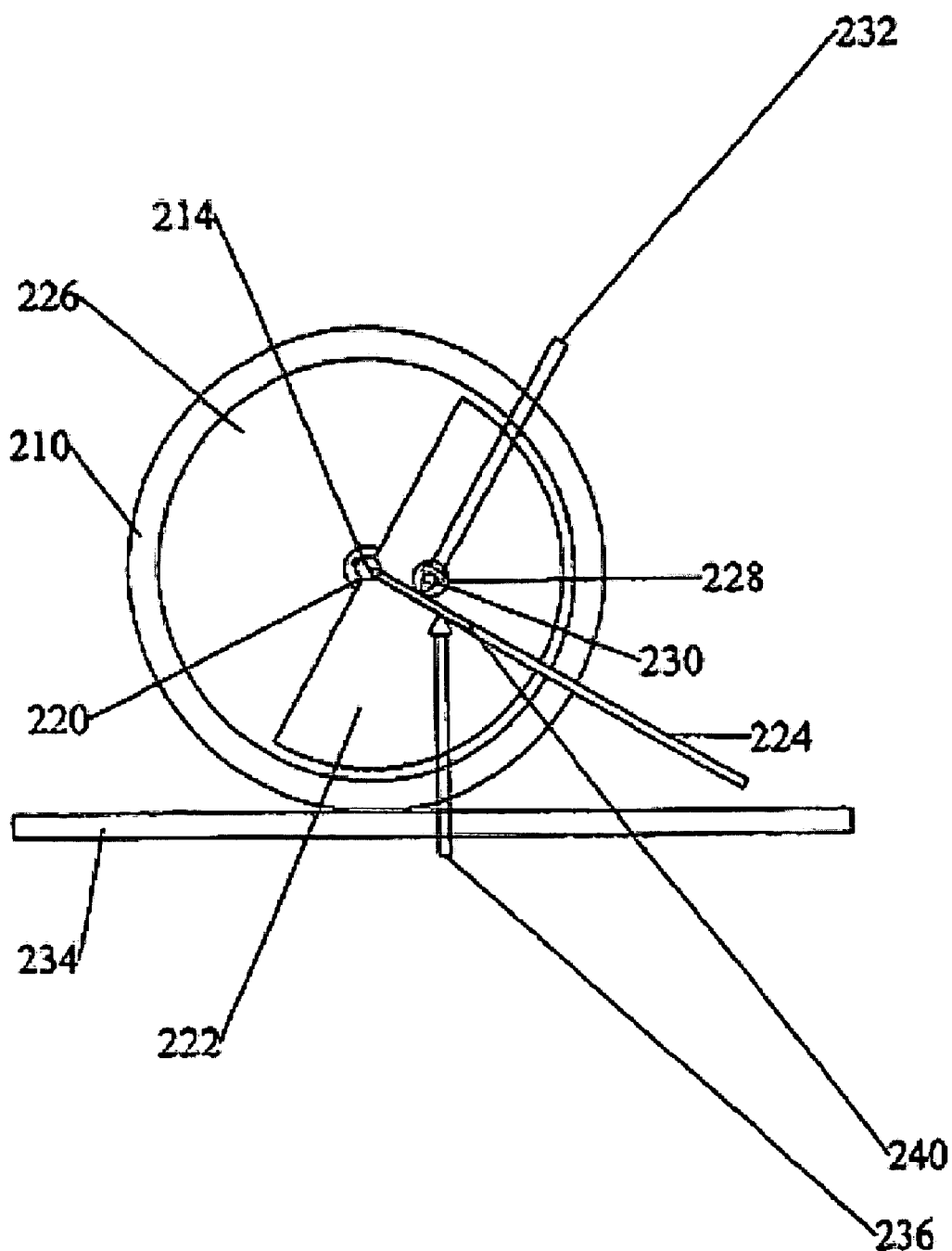
FIG. 7a a further side elevation schematically illustrating the force relationship of the apparatus when an actuating force is applied at a different position to that shown in FIG. 6.

Referring now to FIG. 7, an additional advantage of the present invention is illustrated. It will be appreciated that the pivotal displacement force (232) that would need to be applied to the lever (224) to effect displacement of the floatation member (222) through any particular angle from its equilibrium position will significantly increase as that force is applied at a distance closer to the cylinder axis (214). This is illustrated in FIGS. 6, 7 and 7a whereby the size of the pivotal displacement force is schematically illustrated and is relative to the size of the displacement force arrow (232) shown in these figures. As will be understood from the basic resolution of the forces acting on the cylinder in these three examples, the beneficial effect of leverage is shown where, despite the greater rotational force (232) applied closer to the cylinder axis, the resultant force (240) remains constant for that angle of displacement of the lever. However, the resultant force (240) will be dependent on the angle of rotation of the lever (224) from its equilibrium position irrespective of where the pivotal force (232) is applied along its length. Thus this present embodiment provides a specific means of controlling the magnitude of the resultant force effecting displacement of the cylinder (210). Conversely, a smaller pivotal displacement force (232) is required if it is applied further away from the axis (as in FIG. 6) and here the resultant force is of a smaller magnitude and thus the force applied to effect lateral displacement of the drum is less than that would be incurred by employing the use of a greater pivotal displacement force (232) as shown in FIG. 7. Thus the angle or degree of pivotal displacement of the lever (224) can be used to vary the relative rotational speed of the cylindrical container (210) achieved by utilisation of the present invention. Alternatively, a smaller rotational displacement force may be employed to move the cylinder (210).

A specific advantage of this particular embodiment is that the cylinder (210) may be of considerable mass and provided that the lever length (224) is sufficient, then a relatively small pivotal displacement force (232) can be applied to effect rotational displacement of the mass of cylinder (210). This provides for a very efficient means of moving a very heavy weight. Specific examples could be the movement of very heavy drums of liquid material or drums having weighted materials positioned about their circumference. For example, viewing the cylinder (210) shown in FIG. 6 specific pockets could be incorporated in to the cylinder or in its inner surface so as to carry materials. An operator can then displace the lever (224) by application of relatively small force at a large distance from the axis of the cylinder (214) so as to impart a resultant force (240) acting on the cylinder (210) to allow movement of that cylinder (210) from right to left as viewed in FIG. 6 and thus provides a low energy means of moving a very large weight.

One specific utilisation of the apparatus of this type would be to incorporate such cylinder (210) or cylinders as the main drive wheel/s of a cart or other wheeled vehicle to allow transportation of materials placed upon that vehicle. Thus, an operator could simply walk behind the cylinder (210) maintaining the appropriate perpendicular pivotal displacement force (232) on the lever (224) to maintain motion of that vehicle, allowing the user to move a weight (that he would not necessarily be able to achieve movement of alone) by utilisation of the resultant buoyancy force (240) exerted on the floatation member (222) within the cylinder (210) and by utilising the mechanical advantage achieved by use of a sufficiently long lever (224).

Figure 9:
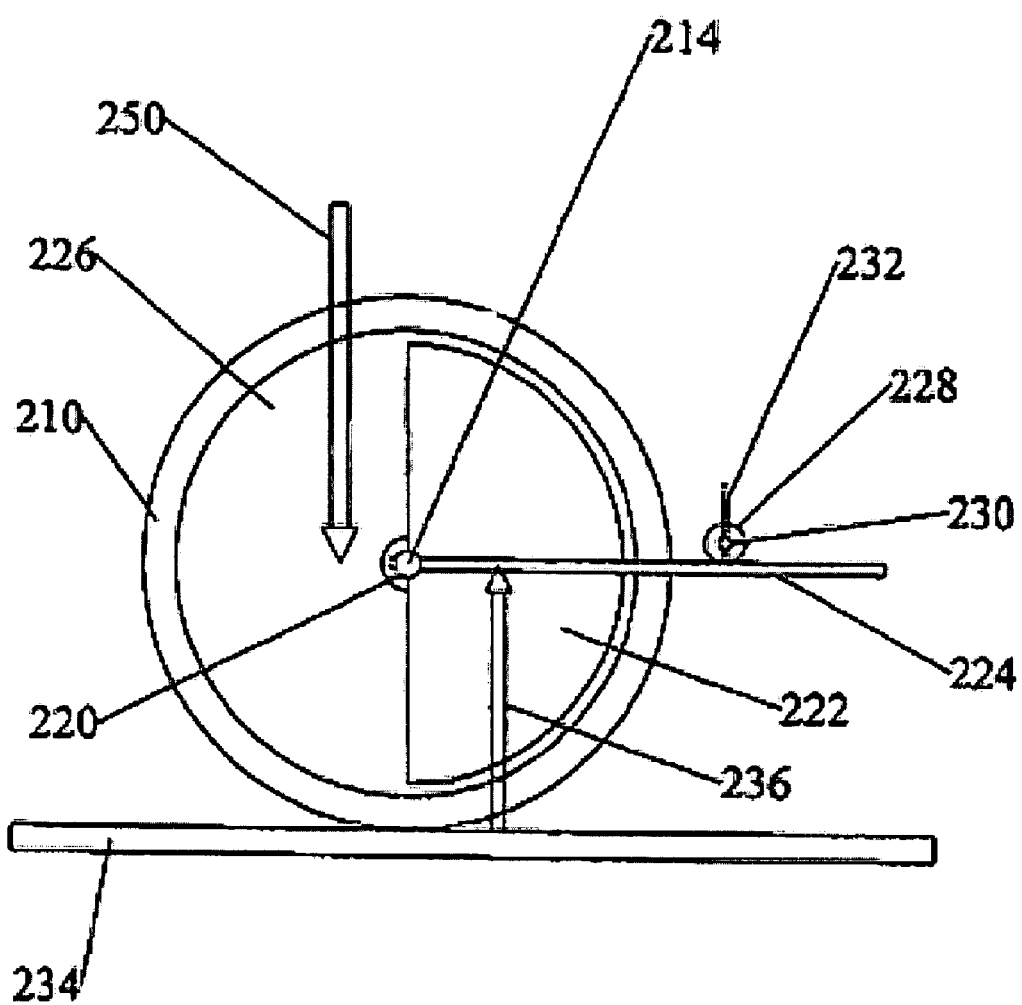
FIG. 9 is a side elevation schematically illustrating the force interaction when the apparatus is in a stable position as shown in FIG. 8.

Furthermore, referring to FIGS. 8 and 9, a further advantage of the current invention will be described in relation to the embodiments shown in FIGS. 1 and 2. If the lever (224) is displaced to a horizontal position as shown in FIGS. 8 to 9 then the upthrust force (236) exerted by the mass of water (illustrated at (250) in FIG. 9, acts perpendicularly to the lever (224) as does the pivotal displacement force (232) whereby the moment exerted on the lever (224) by the upthrust (236) is equivalent and balanced by the moment created by the pivotal displacement force (232). In this scenario there is no resultant force vector directed towards the axis (214). Once the lever (224) has thus been displaced to this horizontal position there is no resultant displacement force exerted against the cylinder (210) which thereby comes to rest or achieves a stable state. What is seen in practice, is as the lever (224) approaches this horizontal position then the resultant vector gradually decreases until it is zero at 90°. In practice, this provides a very efficient means of "braking" the movement of the cylindrical container (210) and thus provides a further advantage that speed control and braking can be achieved by control of the angular position of the lever (224) relative to a horizontal plane extending through the axis (214) of the cylinder (210). As will be appreciated from the basic resolution of force vectors, the greater the angle between the lever (224) and the horizontal plane, then the greater resultant force acting on the axis will be achieved, and the greater the resultant force, the greater the speed applied to displacement of the cylindrical container (210). As this angle is decreased towards 0° when the lever is horizontal, the resultant force is diminished until such time, where the angle is 0° motion is stopped. This is reflected in a practical use whereby returning the lever (244) to its horizontal position is sufficient to rapidly decelerate and slow the cylinder (210) irrespective of its initial momentum. Thus, when used as a basis for moving heavy materials or driving a vehicle, a user, by simply maintaining the force perpendicular to the lever (224), can carefully control, move and brake displacement of the cylindrical container (210).

As such, it will be appreciated the basic inventive concept herein disclosed relies on the translation of the buoyancy upthrust force being exerted on a displaced floatation member (222) to exert a resultant translational force on the axis (214) of that pivotal floatation member (222) and which force is used to effect translational movement of a container (210).

However, in a second embodiment of the present invention, shown in FIGS. 10 through 29, the resultant translational force applied to the pivot axis of the floatation member can alternatively be used to effect rotational displacement of an article about a second article axis extending perpendicular to such pivot axis. The resultant rotational movement of this article can then be used for a number of operations such as a drive mechanism for operating a motor or other mechanical equipment or, through an appropriate gear mechanism to achieve a linear displacement operation of a mechanical apparatus attached thereto.

Referring now specifically to FIGS. 10 through 29, an apparatus will be described which effectively presents a motor, and which utilises the buoyancy upthrust on a floatation member to assist displacement of a substantially vertical drive shaft. The construction of this motor will now be described.

Figure 10:
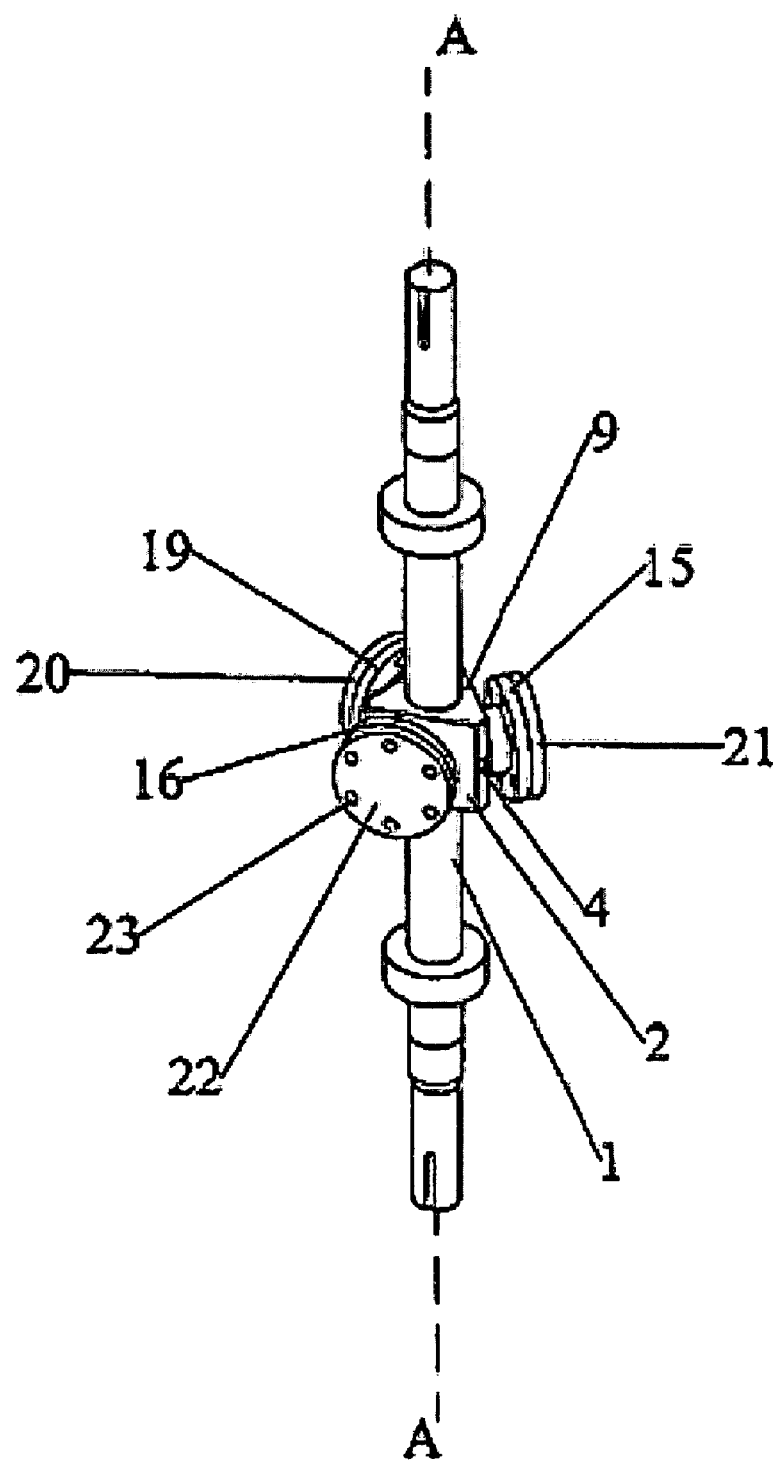
FIG. 10 shows a rotatable drive shaft for use in apparatus according to a second embodiment of the present invention.
Figure 12:
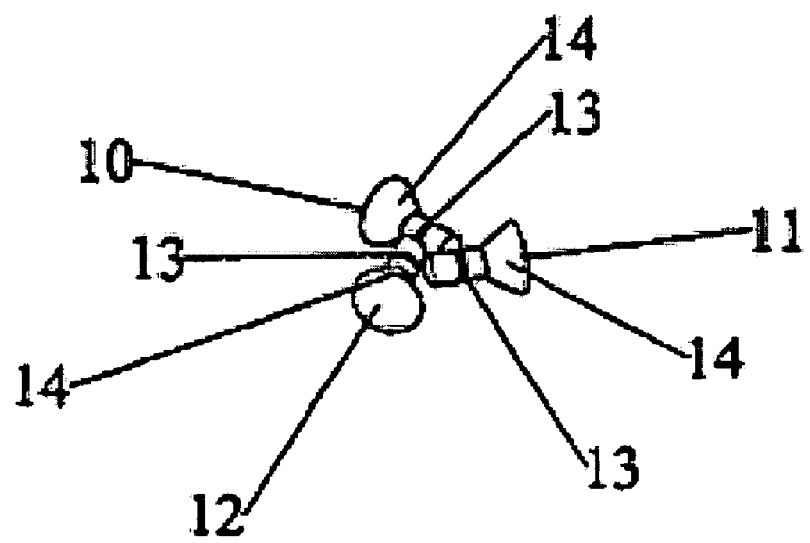
FIG. 12 schematically illustrates the pins of FIG. 11 with the bushes removed.

Referring to FIG. 10, a substantially vertical drive shaft (1) is shown having an elongate vertical axis (A) about which axis the drive shaft (1) is rotatable. This drive shaft (1) is vertically symmetrical about its centre so that its two opposed ends are identical. Mid-way between its two opposed ends is a mounting block (9) which, in cross section, forms an equilateral triangle, albeit the three apiles of such equilateral triangle have been flattened as shown in FIG. 10. The three major vertical sides of this triangular block (9) are thus disposed at 120° relative to one another about the axis (A). Although not shown, the centre of each of these side walls (2) of the block (9) have holes positioned in the middle thereof and extending perpendicular to such side walls. These perpendicular holes are positioned such that their relative axis do not intersect with the axis (A) of the drive shaft (1). Referring to FIG. 12, each of the holes will then receive three identical pins (10, 11, 12) each of which pins comprises a conical shaped (countersunk) head (14) and have a circumferentially extending groove (13). FIG. 12 illustrates the spatial relationship of the three pins when inserted in the holes within the block (9). Each of the conical shaped heads (14) has a flat outer surface each of which flat outer surface is therefore disposed at 120° to one another so that they extend substantially parallel to the flat faces (2) of the triangular block (9). Again, referring to FIG. 12 each of the flat apices of the triangular block (9) is provided with an appropriate screw threaded hole (4) allowing an appropriate screw threaded member to be inserted therein so as to engage with the circumferential groove (13) of an associated pin member to hold the pins (10, 11, 12) within the block (9).

Figure 11:
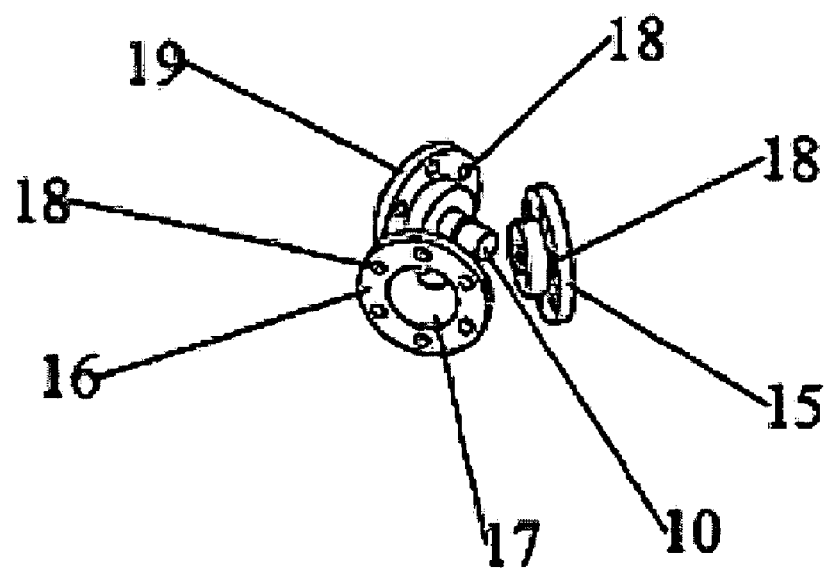
FIG. 11 schematically illustrates the spacial relationship between pin support members for mounting on the drive shaft of FIG. 10.

Referring now to FIG. 11, three identical bushes (19, 15, 16) are schematically illustrated, each of which comprise a plurality of screw holes (18). These bushes (19, 15, 16) are mounted to the main drive shaft (1) by complimentary engagement with the three pin members (10, 11, 12). The countersunk heads (14) of each pin member will be received in an appropriate corresponding countersunk holes (17) of each bush (19, 15, 16). In this manner the three bushes (19, 15, 16) are disposed at 120° to one another and each freely rotatable around their associated pinhead (14). As seen in FIG. 10, three identical bush caps (20, 21, 22) are then connected to each of the bushes (19, 15, 16) respectively. The bush caps (20, 21, 22) are held on the bushes (19, 15, 16) by screws extending through appropriate holes (23) which correspond with the screw holes (18) on the bushes (19, 15, 16). The bush caps (20, 21, 22) serve to maintain the countersunk heads (14) of the pins (10, 11, 12) in appropriate engagement with the countersunk conical hole (17) of each bush (19, 15, 16). In this manner, the bushes (19, 15, 16) are now free to rotate about their respective pins (10, 11, 12).

Figure 13:
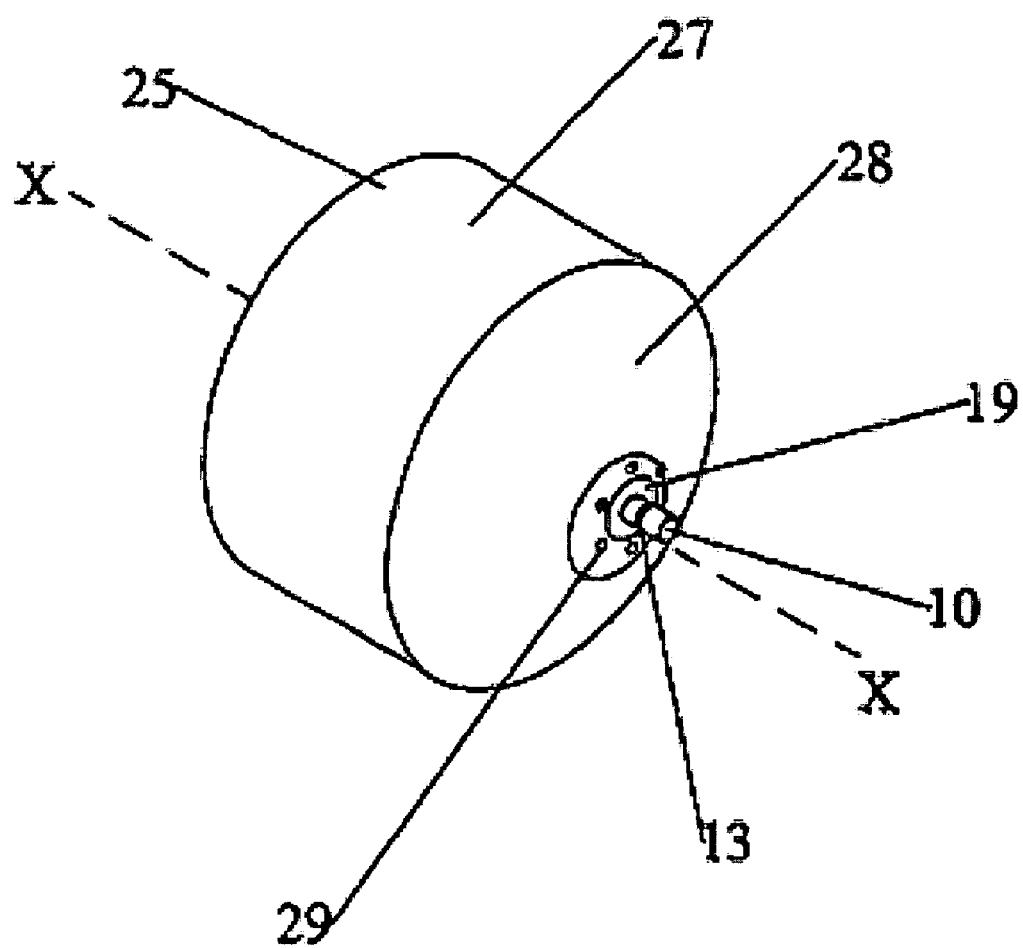
FIG. 13 is a rear view showing a floatation member mounted on one of the bushing and pins of FIG. 11.
Figure 14:
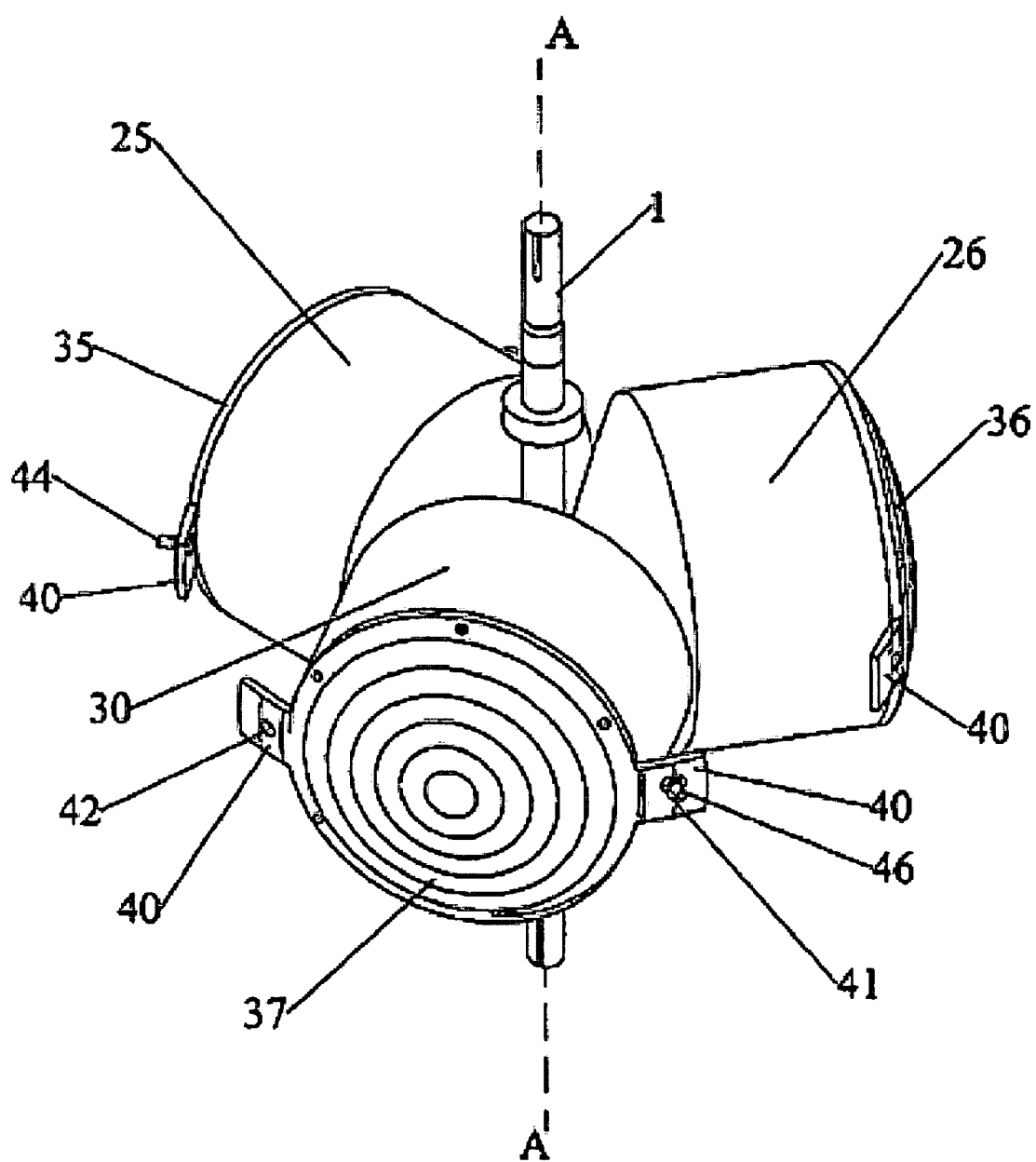
FIG. 14 shows three floatation members mounted on the rotatable drive shaft of FIG. 10.

Referring now to FIGS. 13 and FIGS. 14, each of the bushes (19, 15, 16) will have a substantially identical floatation member or floatation body (25, 26, 30) connected thereto by use of appropriate screw threaded engagement. Each of the floatation members (25, 26, 30) are substantially cylindrical containers having a substantially conical end section (28). Each of the conical end sections (28) having substantially flat apices provided with appropriate screw threaded holes (29) to permit screw threaded engagement with the appropriate screw holes (23) on the bush cap (20, 21, 22). Specifically, it can be seen from FIG. 13 that the screw holes (29) are disposed to as to be eccentric relative to an axis (X) of such cylindrical floatation member (25). In this manner, each of the floatation members (25, 26, 30) are disposed so as to be eccentrically rotatable about the pin axis of each of the three pin members (10, 11, 12) to which they are mounted.

As seen in FIG. 14, the three floatation members (25, 26, 30) are substantially identical and are sealed hollow containers each having, respectively, removable end covers (35, 36, 37) respectively. These end covers (35, 36, 37) can be connected onto each floatation member (25, 26, 30) by appropriate screws (not shown) to thereby provide for internal access to the floatation member (25, 26, 30) to allow connection to be effected to the appropriate bushes (19, 15, 16). The covers (35, 36, 37) are then connected to these floatation members (25, 26, 30) to provide sealed buoyant containers. Furthermore, as seen in FIG. 14, each of the covers (35, 36, 37) are provided with two diametrically opposed tabs (40) which extend radially outwards of the floatation members (25, 26, 30) away from floatation member (25, 26, 30) axis (X). In this preferred embodiment, one of each pair of tabs (40) is provided with a hole (42) to permit attachment of an appropriate weight member so as to counter balance the imbalance achieved by the eccentric location of the pins (10, 11, 12) with respect to the floatation member (25, 26, 30) axis (X). The trailing tabs (40) are provided with appropriate elongate slots (41) for accommodating appropriate force transmitting members in the form of elongate pegs (44, 45, 46) which will be described below.

Figure 15:
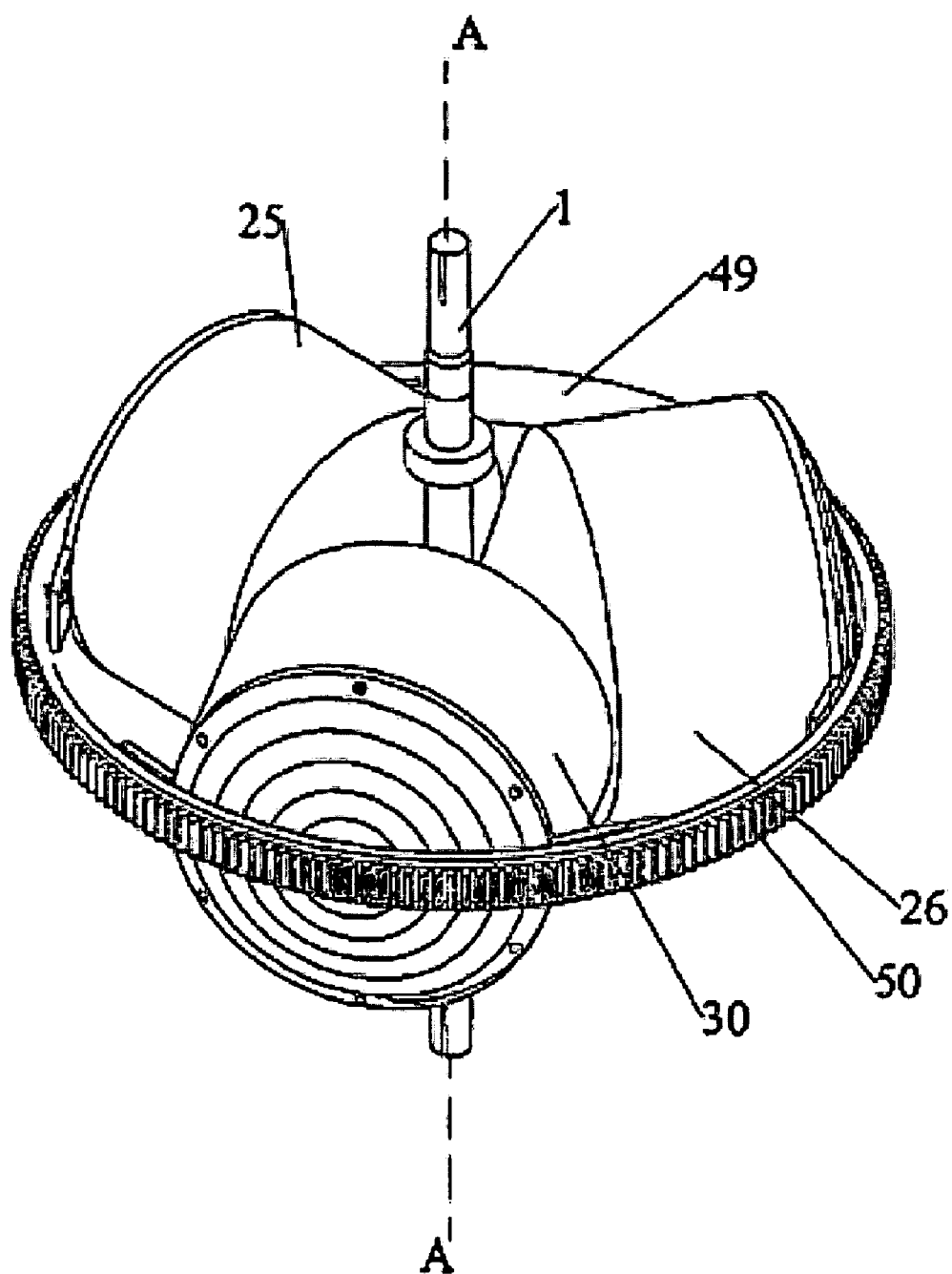
FIG. 15 shows a ring gear mechanism of the apparatus according to the second embodiment mounted in communication with the floatation members of FIG. 14.
Figure 16:
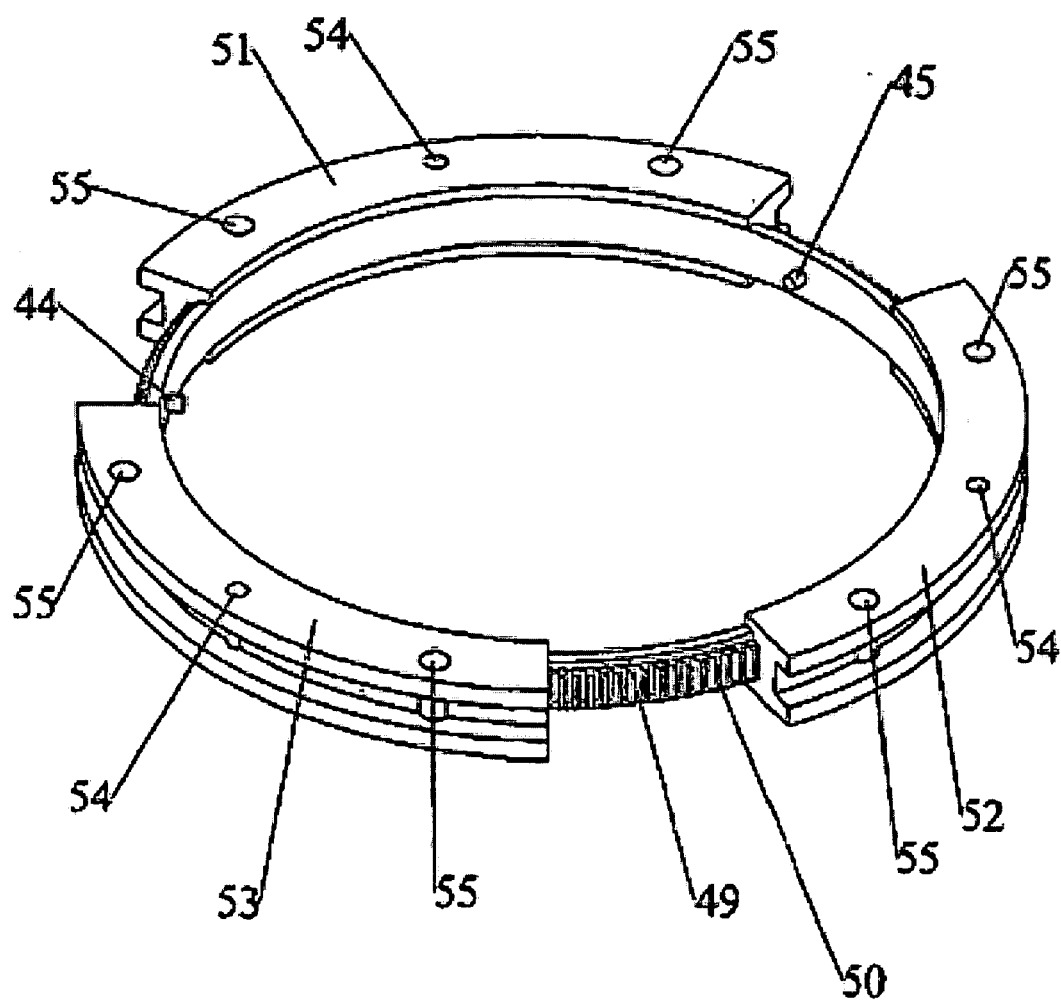
FIG. 16 schematically illustrates the mounting of the ring gear of FIG. 15 held within support guides.

Referring now to FIG. 16 each of the pegs (44, 45, 46) are disposed on the inner surface of a circular ring gear (49) (which is to be mounted concentrically with the drive shaft axis (A), each peg (44, 45, 46) therefore disposed at an angle of 120° relative to the other one about Axis (A) so that each can be received within the centre of the slot (41) of each associated floatation member (25, 26, 30) respectively, and as shown in FIG. 15. The ring gear (49) itself comprises a series of teeth (50) on its outer surface for engagement with an appropriate drive mechanism as will be described below. As seen in FIG. 16 the ring gear (49) is then supported by three substantially identical ring gear guides (51, 52, 53) which permit rotation of the ring gear therein.

As seen in FIG. 15, this ring gear (49) is mounted concentrically and coaxially with the main drive shaft (1).

The three identical ring gear guides (51, 52, 53) each comprise an aperture (54) therethrough for accommodation of guide sticks (73, 74, 75) (as will be described below). Each ring gear guide (51, 52, 53) further comprises two additional holes (55) extending therethrough for accommodating support rods (88, 89, 90, 91, 92, 93) for maintaining the ring gear in a pre-determined orientation within the overall apparatus (as will be described below).

Figure 17:
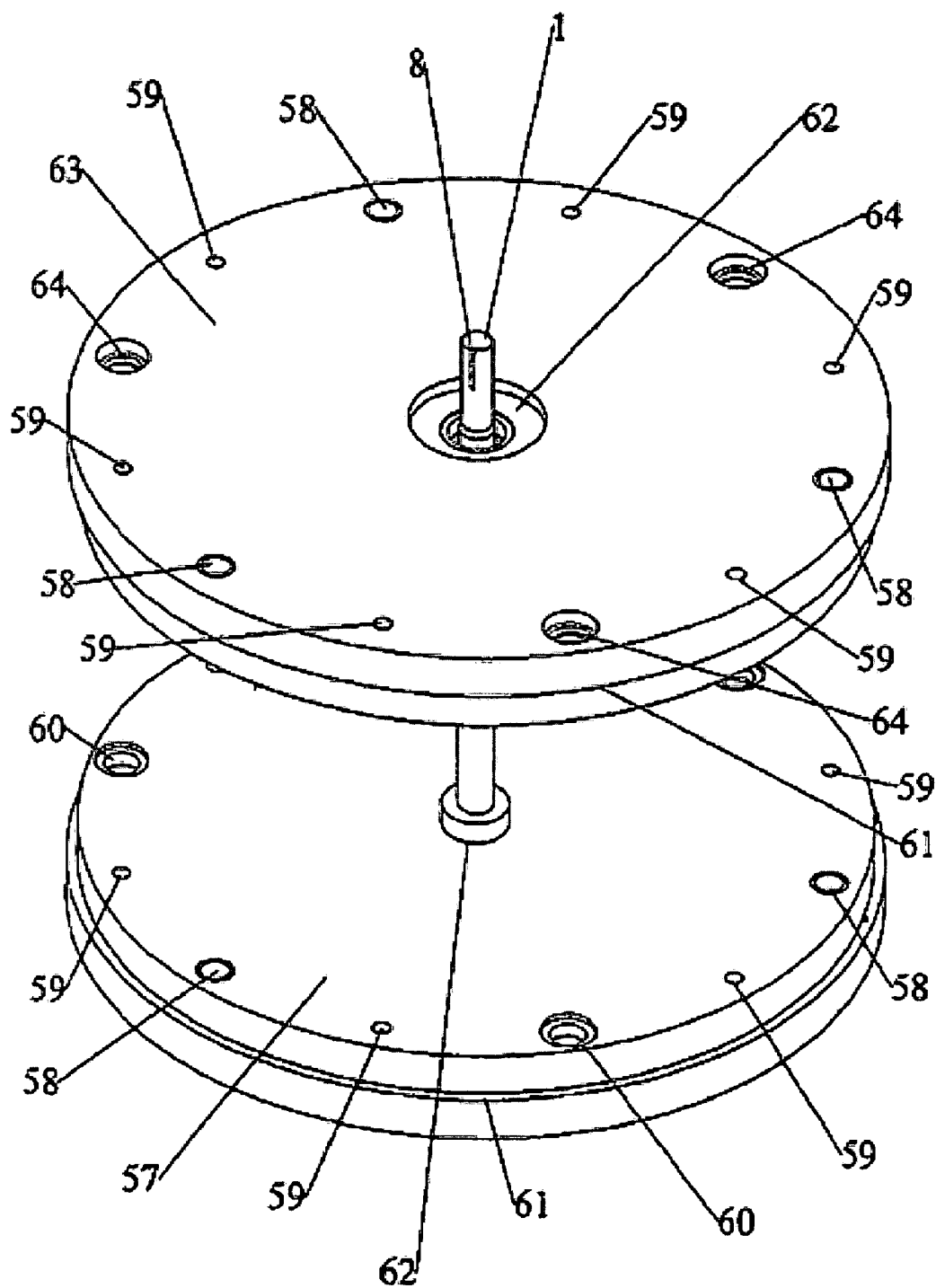
FIG. 17 schematically illustrates the relationship between the rotary drive shaft of FIG. 10 and a container base plate and a top plate of the apparatus according to a second embodiment of the present invention.
Figure 23:
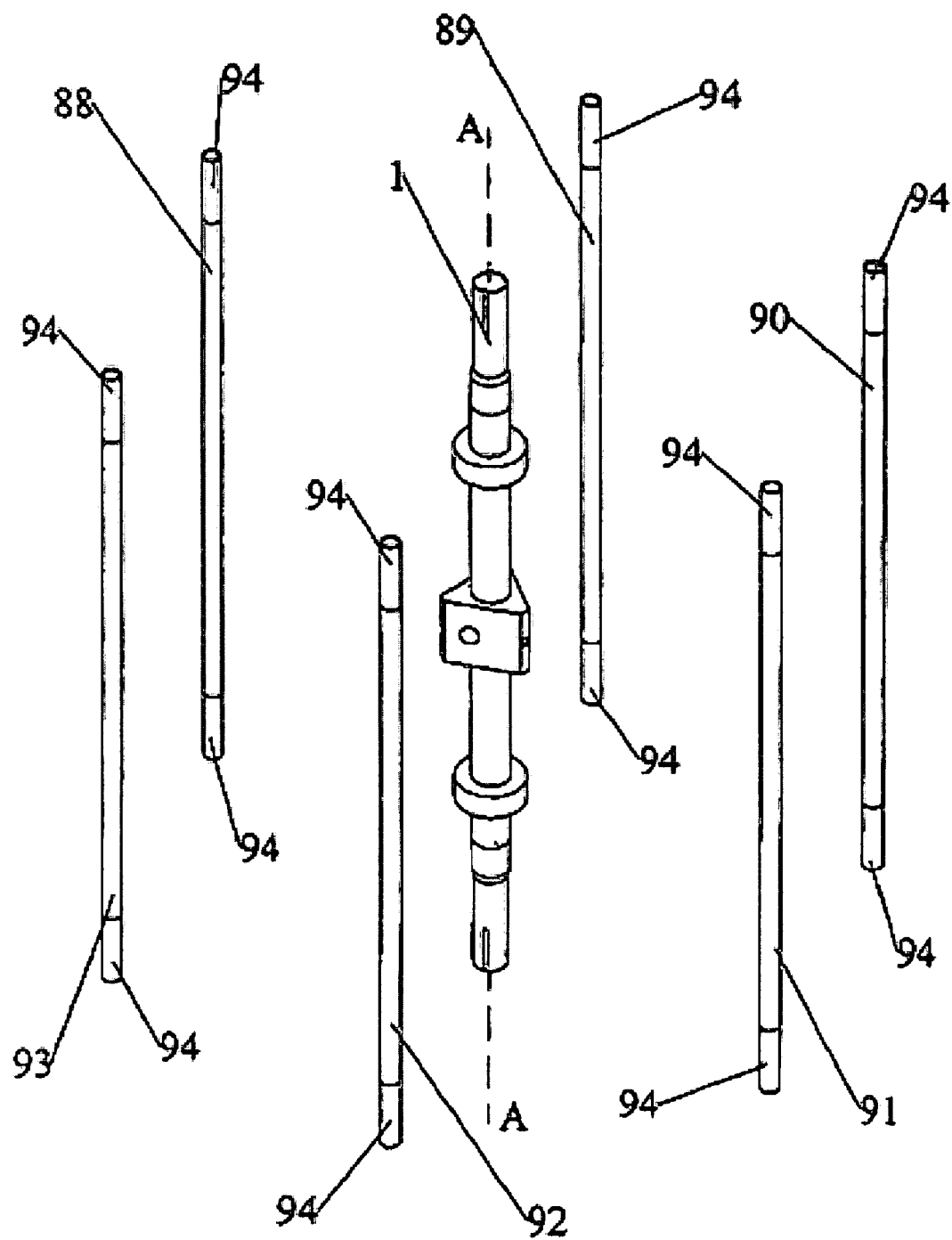
FIG. 23 schematically illustrates the positioning of six support rods about the main shaft.

Referring now to FIG. 17, the apparatus of the second embodiment comprises a sealed container (FIG. 27) having a container base (57) which has three screw threaded holes (58) for accommodating base cylinders (81, 82, 83) (FIG. 21), together with six holes (59) to accommodate support rods (88, 89, 90, 91, 92, 93) (see FIGS. 23). The container base (57) further comprises three housings (60) to accommodate drive gears (65, 66, 67) (as will be described with reference to FIG. 18) below together with their accompanying flanged bushed bearings (not shown). The container base (57) is further provided with a flanged seating (61) for accommodating a cylindrical side wall (95) and a central aperture (62) into which the main drive shaft (1) is inserted as shown. The array of holes (58, 59, 60) are substantially arranged around the periphery of the circular container base (57).

As shown in FIG. 17, the apparatus also comprises a substantially circular container top (63) which is substantially identical to the container base (57) with the exception that the housings (60) are replaced with holes (64) passing completely through the container top (63) whereas the housing (60) only extends partway through the depth of the container base (57). As such, the container top (63) further comprises three screw threaded holes (58) for accommodating top cylinders (78, 79, 80) (see FIG. 21), together with six holes (59) for support rods (88, 89, 90, 91, 92, 93) (see FIGS. 23), together with three holes (64) for accommodating the drive gears (65, 66, 67) (see FIG. 18) and their accompanying bush bearings and accompanying seals (not shown). Again, the container top (63) is provided with an appropriate flange seating (61) together with appropriate hole (62) for accommodating the main shaft (1) as shown. Appropriate flanged bush bearings and accompanying seals, although not shown in the current Figures, are positioned between the drive shaft (1) and both the container base (57) and container top (63) to permit rotation of the shaft (1) between these container base (57) and container top (63) and also to provide an appropriate fluid seal therebetween. As can be seen, the main shaft (1) extends beyond the container base (57) and the container top (63) thereby enabling an appropriate coupling (not shown) to be made with the main shaft (1) via the three key ways (8) in the form of three longitudinally slots disposed at 120° relative to one another about the axis (A).

Figure 18:
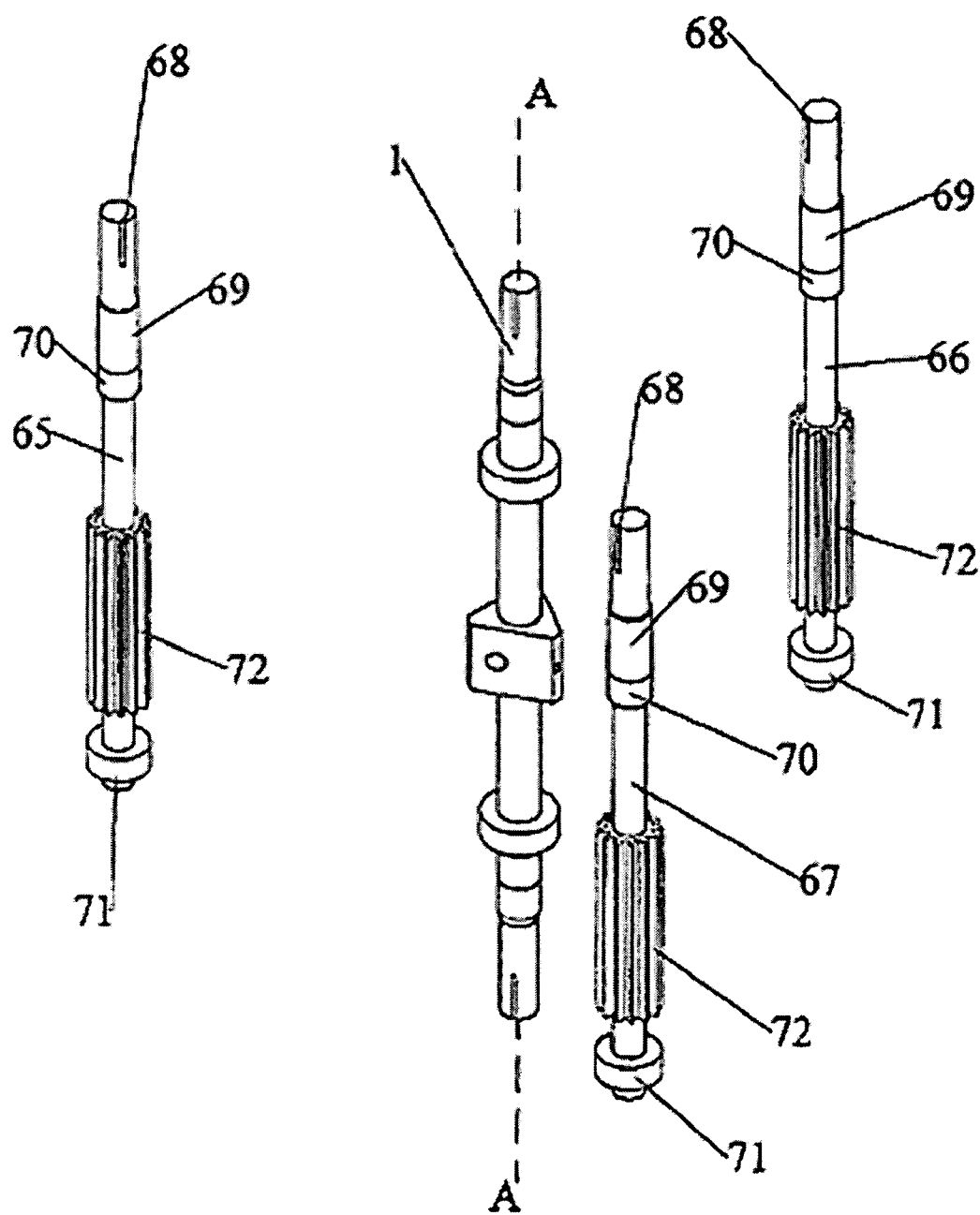
FIG. 18 schematically illustrates three drive gears of the second embodiment disposed about the main drive shaft.
Figure 22:
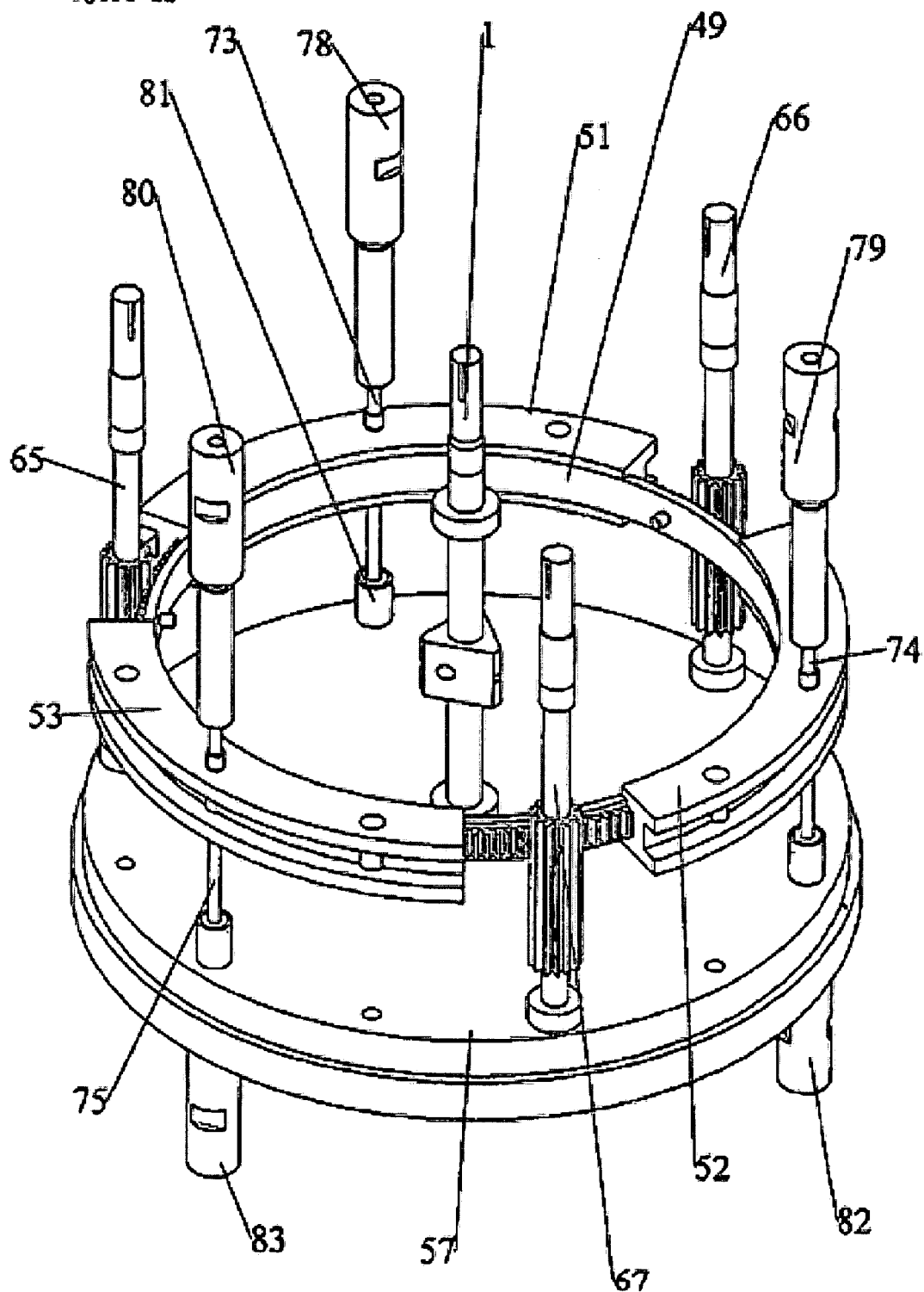
FIG. 22 illustrates the mounting of the ring gear of FIG. 16 in relation to the base plate of FIG. 17 with the floatation members omitted for clarity.

Referring to FIG. 18, there is shown three identical drive gears (65, 66, 67) each comprising three appropriate key ways (68) at an upper end thereof for accommodating couplings (not shown). Each of these drive gears further comprises a cylindrical surface (69) for accommodation within the three respective holes (64) of the container top (63) whereby appropriate flange shaft seals (not shown) permit a rotatable seal between the container top (63) and these drive gears (65, 66, 67). Each of the drive gears (65, 66, 67) further comprises a second cylindrical surface (70) to be accommodated within an inner portion of each hole (64) together with accompanying bush bearings (not shown). The lower portion of each drive gear (65, 66, 67) is provided with a flange seating (71) to be accommodated within the housing (60) of the container base (57), together with appropriate accompanying flange bush bearings (not shown). Thus, as shown in FIG. 22, the circumferential array of teeth (72) mounted on each drive gear (65, 66, 67) is thus able to mesh with the series of teeth (50) of the ring gear (49).

Each of the drive gears (65, 66, 67) is fitted between the container base (57) and the container top (63) with appropriate bushing permitting such drive gears (65, 66, 67) to be rotatable about their respective longitudinal axis (which axis extend parallel with the drive shaft axis (A). Thus rotation of the drive gears (65, 66, 67) effects rotation of the ring gear (49) as for a conventional gear mechanism.

Figure 19:
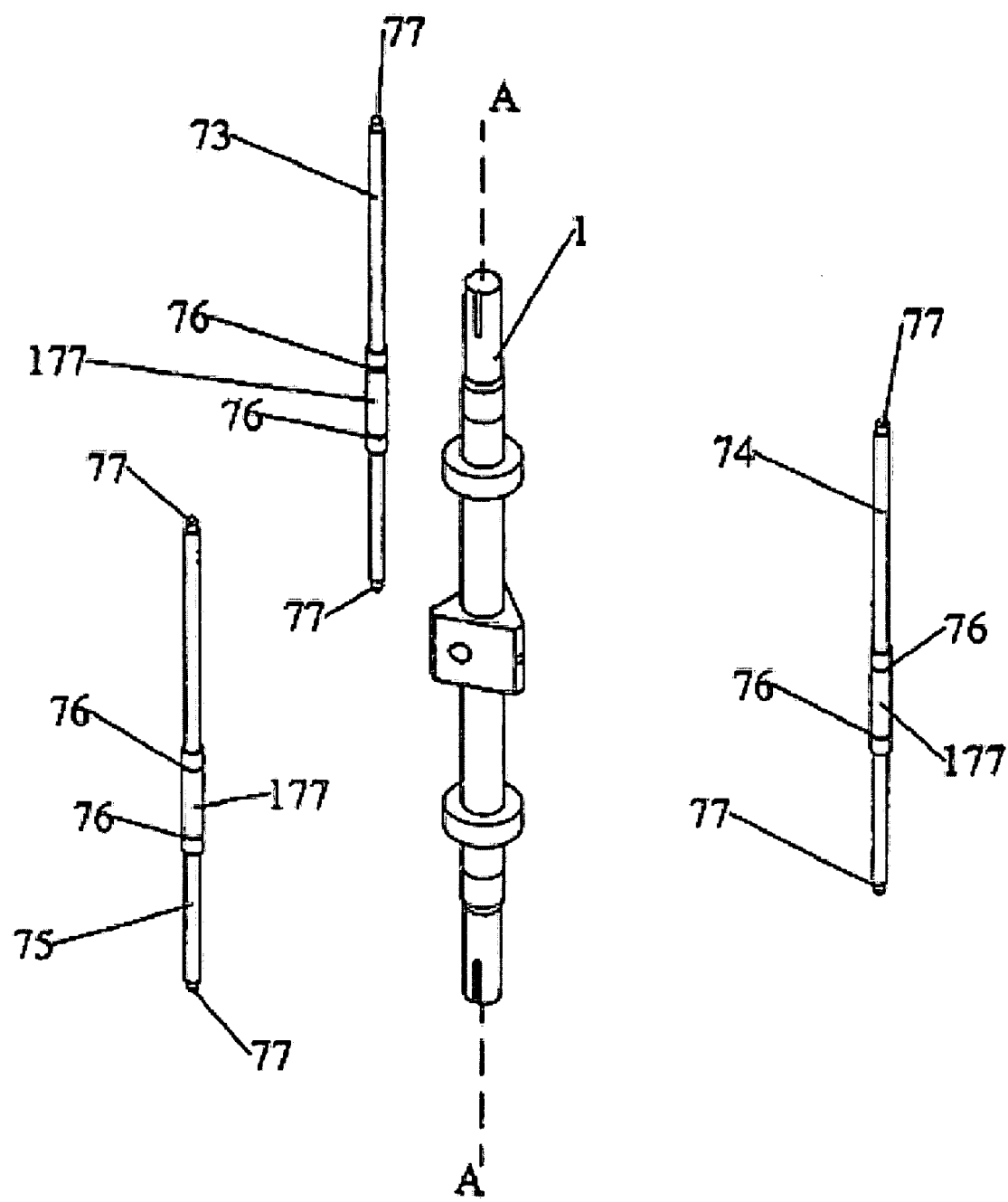
FIG. 19 schematically shows three guide sticks of the second embodiment disposed about the main shaft.

Referring now to FIG. 19, there are shown three identical guide sticks (73, 74, 75) in the form of elongate cylindrical rods each having a cylindrical saddle (177) partway along the length whereby each saddle (177) is provided with an appropriate circumferential groove (76) for accommodating circlips (not shown). Each of these guide sticks (73, 74, 75) is further provided with a piston (77) at each end thereof and which pistons are intended for accommodating appropriate cover seals (not shown).

Figure 20:
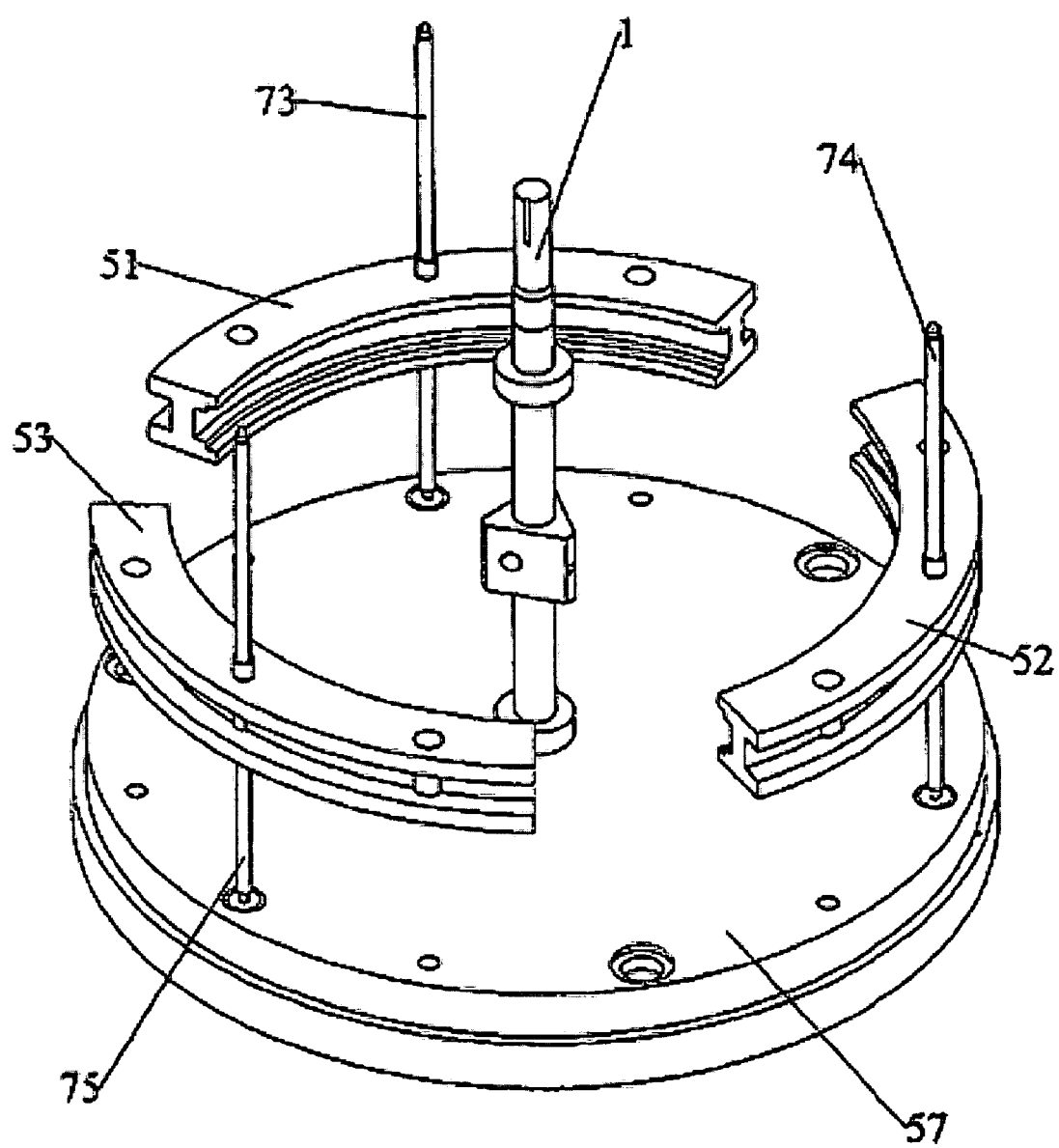
FIG. 20 schematically illustrates the positioning of the guide sticks of FIG. 19, and the ring gear guides of FIG. 16 disposed about the main shaft on the container base plate.

Referring now to FIG. 20 the guide sticks (73, 74, 75) are positioned within the holes (54) of their respective ring gear guide (51, 52, 53) by means of appropriate circlips engaging with the circumferential grooves (76).

Figure 21:
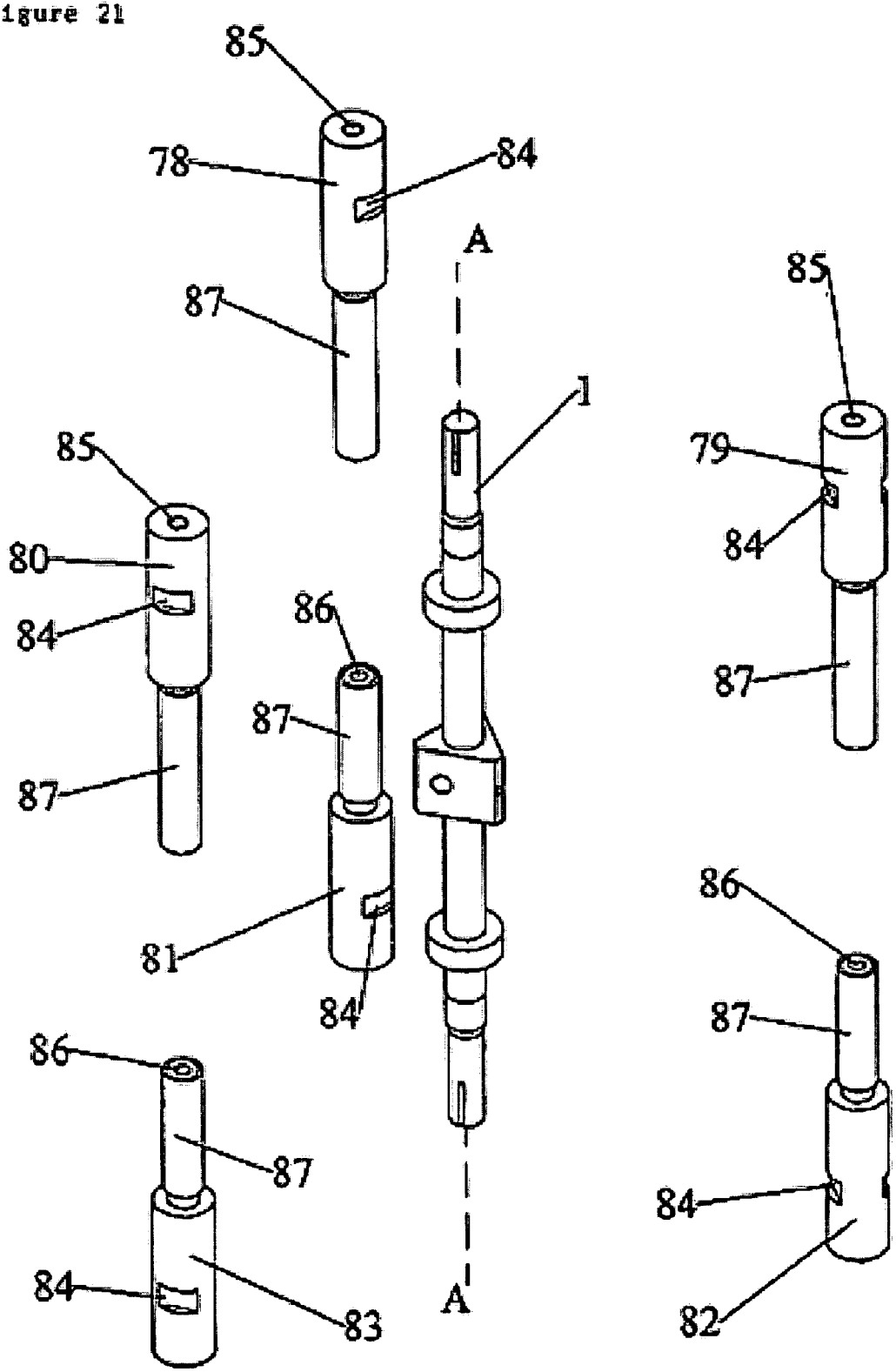
FIG. 21 schematically illustrates the arrangement of the top and bottom cylindrical end stops disposed around the main drive shaft.

The apparatus is further provided with three identical top cylindrical end stops (78, 79, 80) and three identical base cylindrical end stops (81, 82, 83) (FIG. 21). Each of the end stops (78, 79, 80, 81, 82, 83) comprise appropriate flats (84) for accommodating use of a spanner or other tool to allow forced rotation thereof. In addition, each of the end stops (78, 79, 80, 81, 82, 83) is further provided on an outer circular face thereof with an appropriate screw threaded aperture (85) for receiving a screw threaded member to allow appropriate hydraulic fluid to be pumped in or out of these end stops (78, 79, 80, 81, 82, 83). As shown with reference to the base end stops (81, 82, 83), each of the end stops (78, 79, 80, 81, 82, 83) is provided with an inner bore (86) for accommodating a piston (77) of each of the guide sticks (73, 74, 75) respectively. In this way it will be appreciated that each of the six end stops (78, 79, 80, 81, 82, 83) shown in FIG. 21 will be positioned so as to be accommodated on the opposed ends of each guide stick (73, 74, 75) of FIG. 19, (as shown in FIG. 22). The top cylindrical end stops (78, 79, 80) are substantially identical to the base cylindrical end stops (81, 82, 83) with the exception that external screw threaded portions (87) of the top cylindrical end stops (78, 79, 80) is longer than external screw threaded portions (87) of the base cylindrical end stops (81, 82, 83) as shown. FIG. 22 shows the base cylindrical end stops (81, 82, 83) each screwed into their respective holes (58) in the container base (57), and each of which receives a piston (77) of an associated guide stick (73, 74, 75) within the aperture (86) thereof. The opposed or top pistons (77) of each guide stick (73, 74, 75) and appropriate accompanying cover seals (not shown) are then received within the bores (86) of their respective top cylindrical end stops (78, 79, 80). The guide sticks (73, 74, 75) are maintained within the appropriate holes (54) of their respective ring gear guides (51, 52, 53) by means of circlips engaging within grooves (76) so as to retain the ring gear guides (51, 52, 53) fixed along the length of each guide stick (73, 74, 75). As previously described, each of the cylindrical end stops (78, 79, 80, 81, 82, 83) has an appropriate aperture (85) to allow hydraulic fluid to be pumped in or out of these cylindrical end stops (78, 79, 80, 81, 82, 83) so as to hydraulically displace the pistons (77) of the guide stick (73, 74, 75) which effectively causes relative movement of the saddles (177) of the guide sticks (73, 74, 75). Since the saddles (177) are retained by the respective ring gear guides (51, 52, 53), movement of such saddles (177) also causes displacement of the ring gear guides (51, 52, 53) in a vertical direction towards or away from the container base (57) as desired. This provides a means of hydraulically adjusting the height of the ring gear guides (51, 52, 53) and the associated ring gear (49) about the height of the apparatus and relative to the longitudinal length of the main drive shaft (1).

Figure 28:
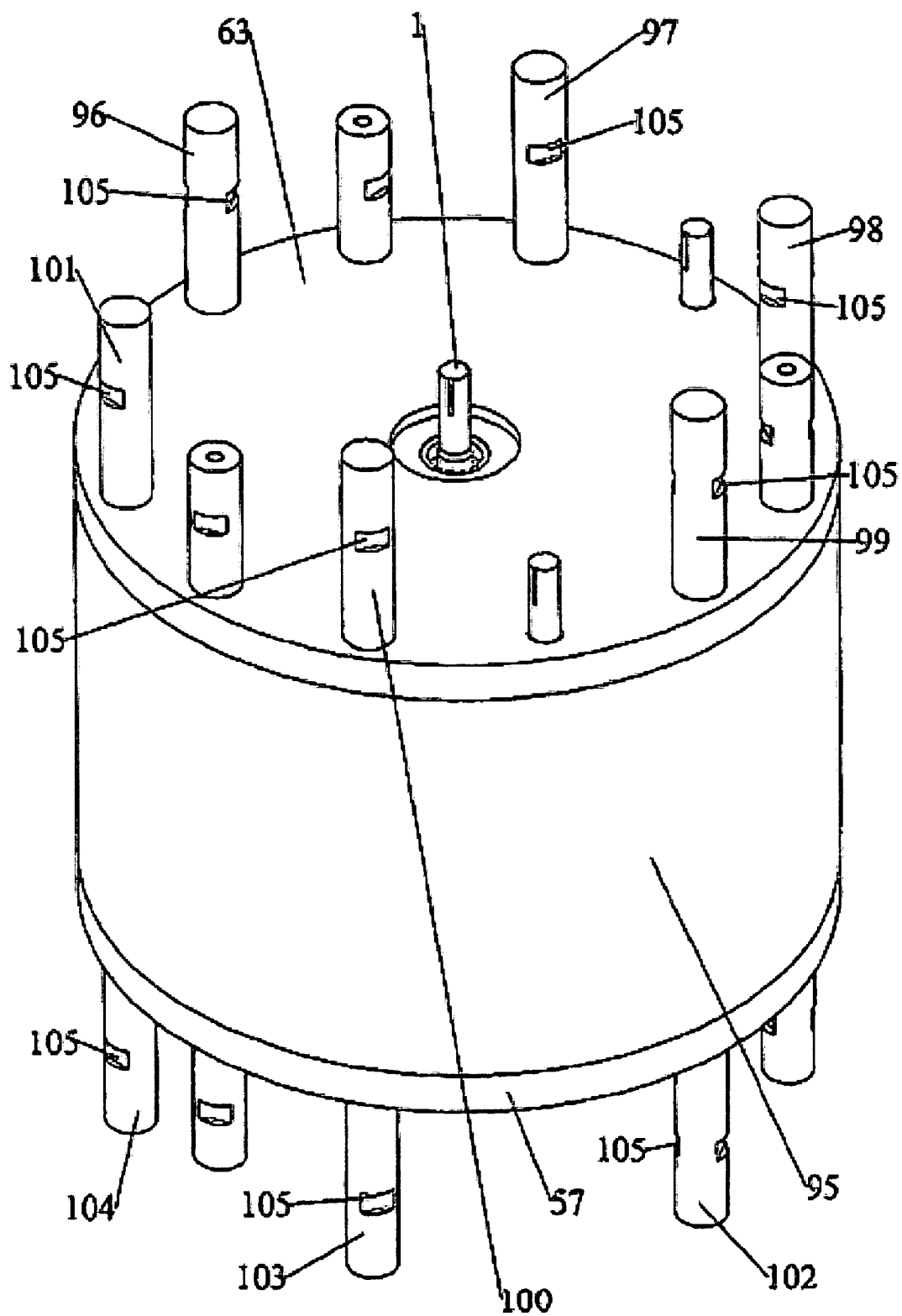
FIG. 28 is a perspective external view of the sealed apparatus according to the second embodiment of the present invention.

FIG. 23 now shows six identical support rods (88, 89, 90, 91, 92, 93), each having about their longitudinally opposed ends external screw threads (94) for receipt of appropriate screw threaded rod ends (96, 97, 98, 99, 100, 101, 102, 103, 104, 106, 107, 108) as seen in FIG. 28. Each of the external screw threaded ends (94) of these identical rods extend through the respective holes (59) in both the container top (63) and container base (57). This is seen in FIG. 24 whereby each of the rods (88, 89, 90, 91, 92, 93) (and appropriate bushed bearings, not shown) are placed through the holes (55) of their respective ring gear guides (51, 52, 53) such that (through appropriate manipulation of the guide sticks (73, 74, 75) such ring gear guides (51, 52, 53) may be made to move up or down along the length of the rods (88, 89, 90, 91, 92, 93).

Figure 24:
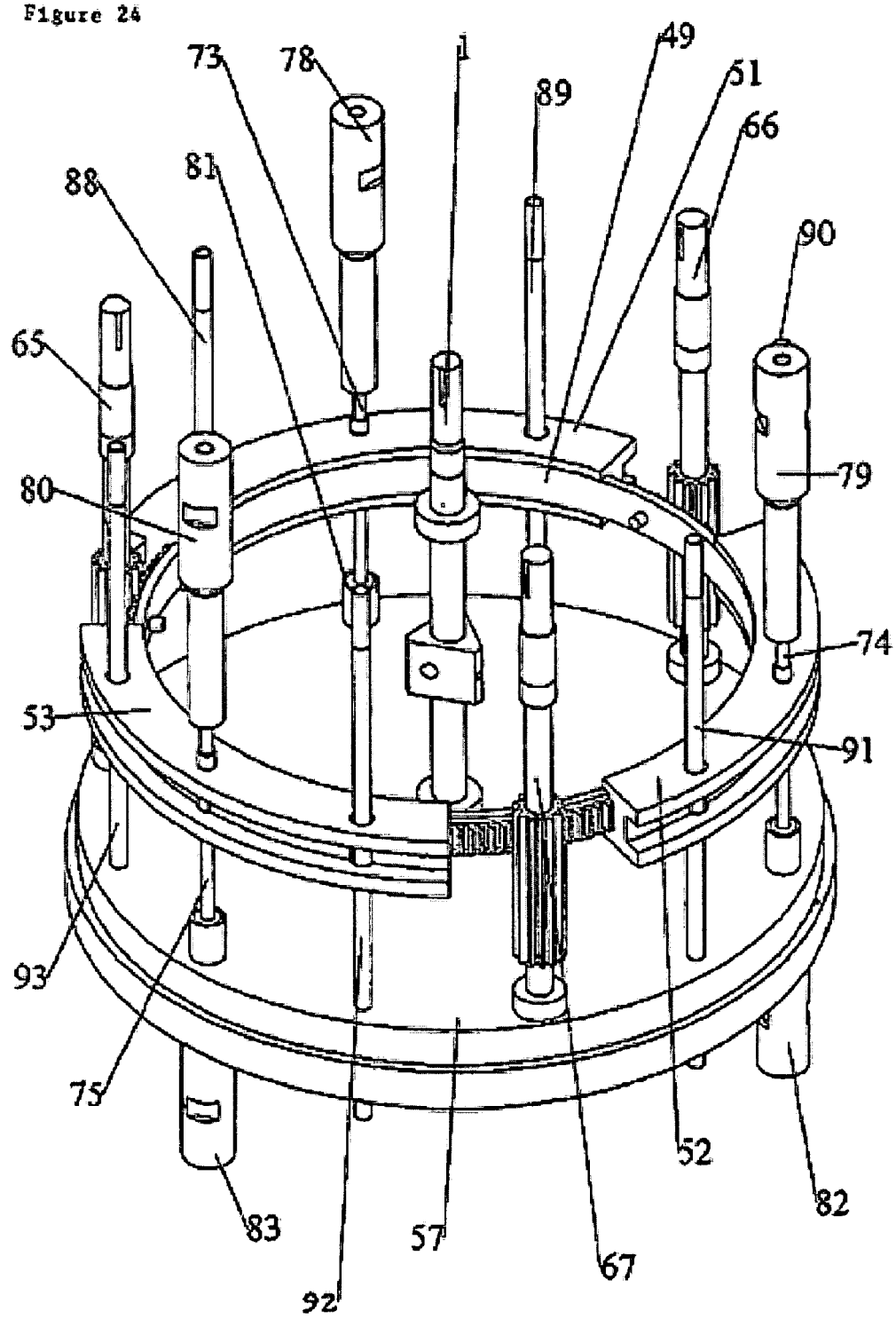
FIG. 24 shows the apparatus shown of FIG. 22 with the inclusion of the support rods of FIG. 23, again with the floatation members removed for clarity.
Figure 25:
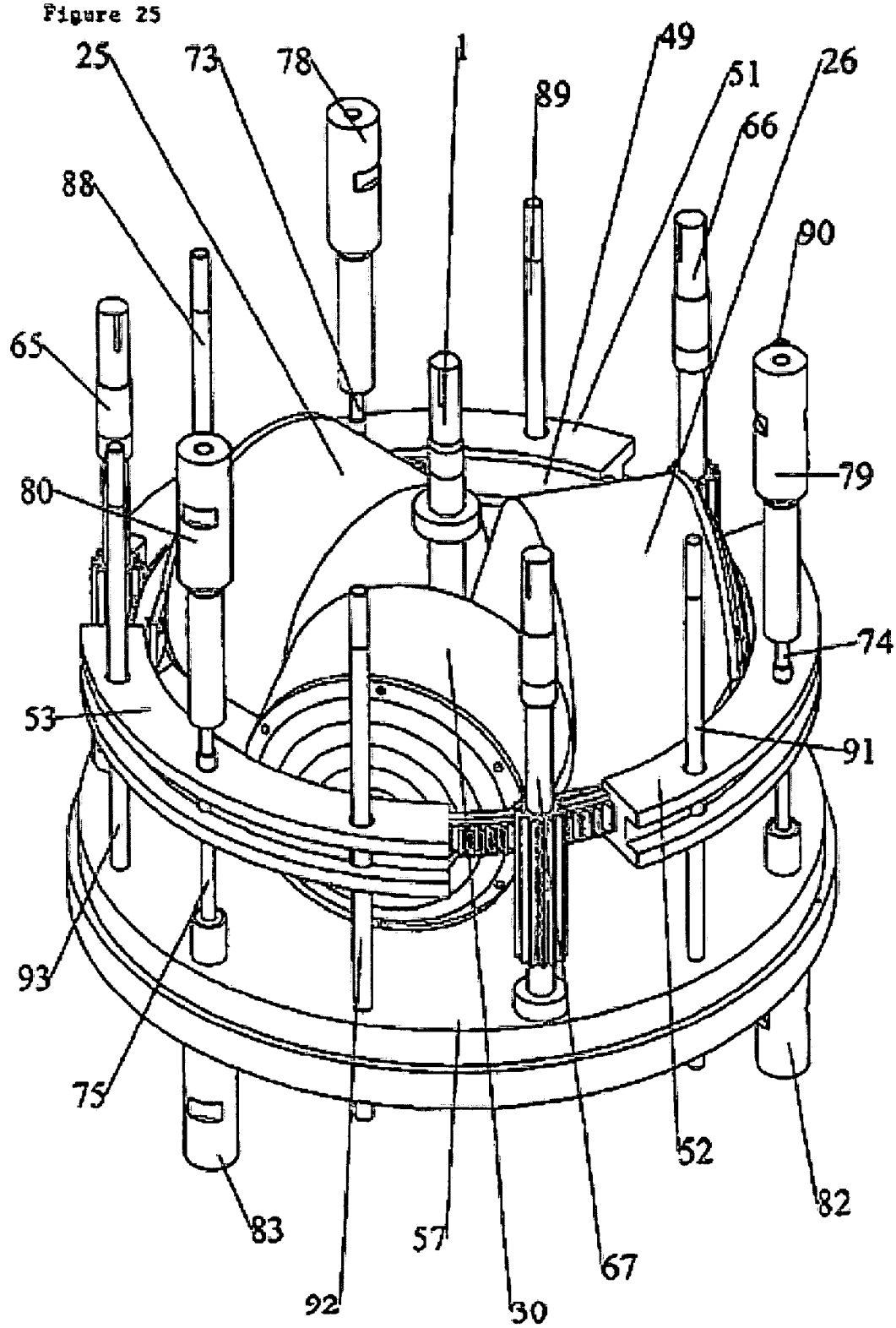
FIG. 25 illustrates the internal configuration of the apparatus according to the second embodiment of the present invention with the container top and side walls omitted.
Figure 26:
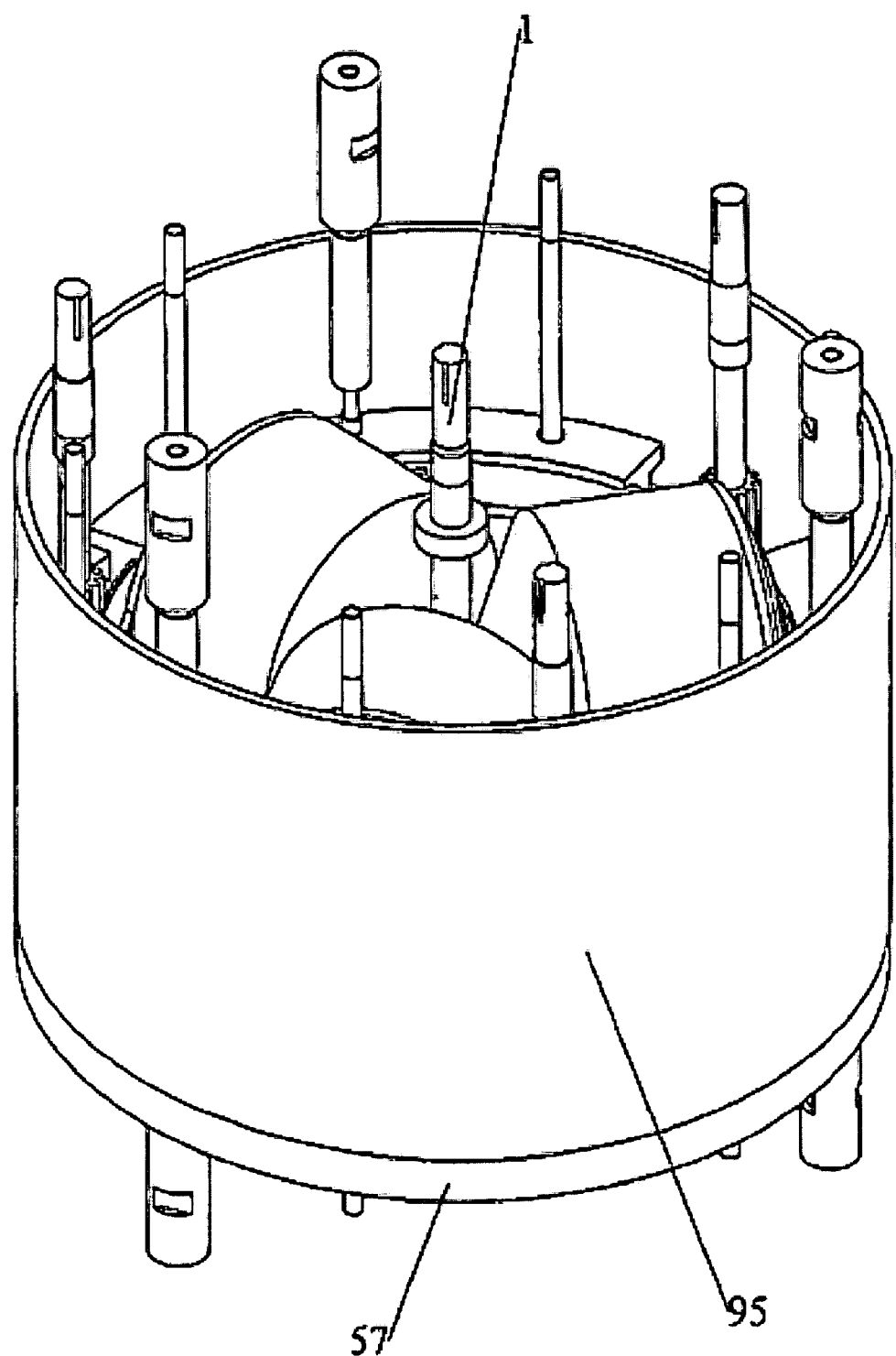
FIG. 26 illustrates the apparatus of FIG. 25 with the circular side wall mounted thereon.

FIG. 25, similar to FIG. 24, now simply shows the three flotation members (25, 26, 30) mounted (as previously described) on the main drive shaft (1) and disposed within the apparatus such that the pegs (44, 45, 46) mounted on the inner surface of the ring gear (49) are now received within the appropriate elongate slots (41) of each floatation member as shown in FIGS. 14 and 16. In this manner, as the ring gear (49) is raised or lowered with respect to the container base (57) and hence with respect to the longitudinally secured drive shaft (1) the floatation members (25, 26, 30) are caused to rotate eccentrically about the respective mounting pins (10, 11, 12) on the drive shaft (1).

Figure 27:
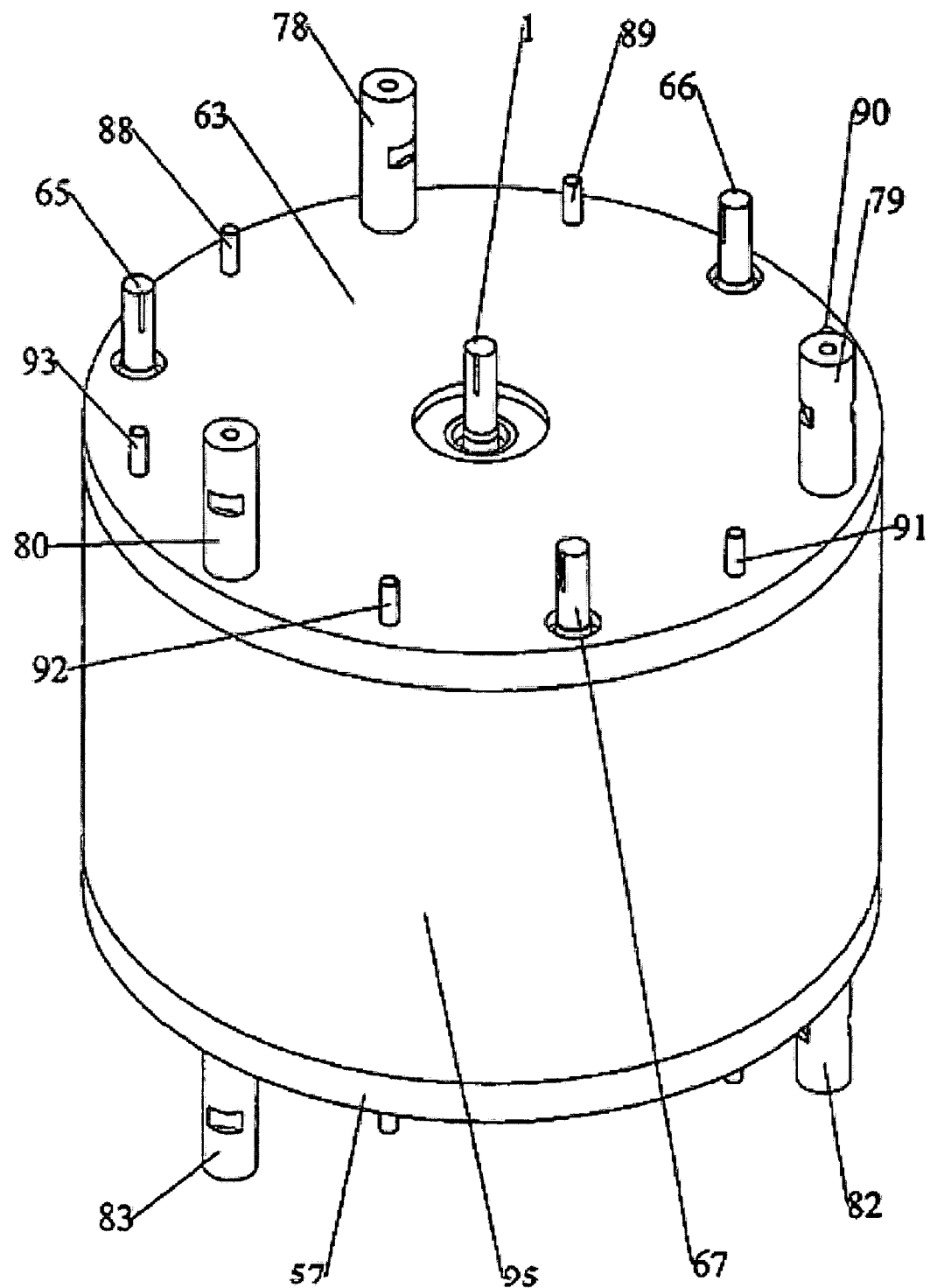
FIG. 27 shows the apparatus of FIG. 26 with the container top mounted thereon.

The apparatus of the second embodiment is then provided with a cylindrical outer wall (95) (FIG. 26) which is received in a substantially fluid sealed fit on the flange seatings (61)

of the container base (57) and the container top (63) (reference FIG. 17). As seen in FIG. 27 the container top (63) is mounted on this wall (95) whereby appropriate screw threaded rod ends (96, 97, 98, 99, 100, 101, 102, 103, 104, 106, 107, 108) (which are effectively sealed screw threaded nuts) are then engaged in a screw threaded relationship with the external screw threaded ends (94) of each of the rods (88, 89, 90, 91, 92, 93) respectively and, through use of appropriate flats (105) formed on each of these rod ends (96, 97, 98, 99, 100, 101, 102, 103, 104, 106, 107, 108) screw threaded engagement therebetween effectively seals the apparatus as shown in FIG. 28. As will be understood by those skilled in the art, where any of the internal rod like members pass through the container base (57) and the container top (63) of this apparatus, appropriate seals are employed to maintain fluid sealed integrity of such apparatus.

Prior to fitment of the container top (63), the apparatus is filled with an appropriate fluid such as water or oil in which the floatation members (25, 26, 30) are caused to float since they have a lower density than that of the liquid used. In the absence of any external influence, and due to the eccentric mounting of these floatation members (25, 26, 30) on their respective pins (10, 11, 12) on the drive shaft (1), these floatation members (25, 26, 30) will seek an equilibrium position when the apparatus is maintained in a substantially horizontal configuration such that the tab (40) is therefore disposed higher than the other tab (40) due to the eccentric rotation of these floatation devices. However, by hydraulic manipulation of the pistons (77) in the manner previously described, and by appropriate insertion or removal of hydraulic fluid within the respective cylindrical end stops (78, 79, 80, 81, 82, 83) connected to such pistons, the ring gear guide (51, 52, 53) can be lowered within the apparatus of FIG. 28 hence effecting a lowering of the associated ring gear (49). Since the pegs (44, 45, 46) are integrally mounted on the inner surface of this ring gear (49) they are also lowered with respect to the apparatus and in a direction parallel to the axis of the drive shaft (1). Since these pegs (44, 45, 46) engage with the elongate slots (41) of each floatation member (25, 26, 30), this downward movement of the ring gear (49) further serves to displace the respective tabs (40) of each floatation member (25, 26, 30) in a downward direction so as to effect eccentric rotation of the floatation members (25, 26, 30) out of their normal equilibrium position and thus incurring a resultant buoyancy upthrust being exerted thereon as the displaced fluid (caused by this movement) exerts an upthrust force attempting to return the displaced floatation members (25, 26, 30) to their equilibrium position. In this manner, the basic principle of operation of the apparatus of the second embodiment is similar to that as described with reference to FIGS. 1 through 10.

Figure 29:
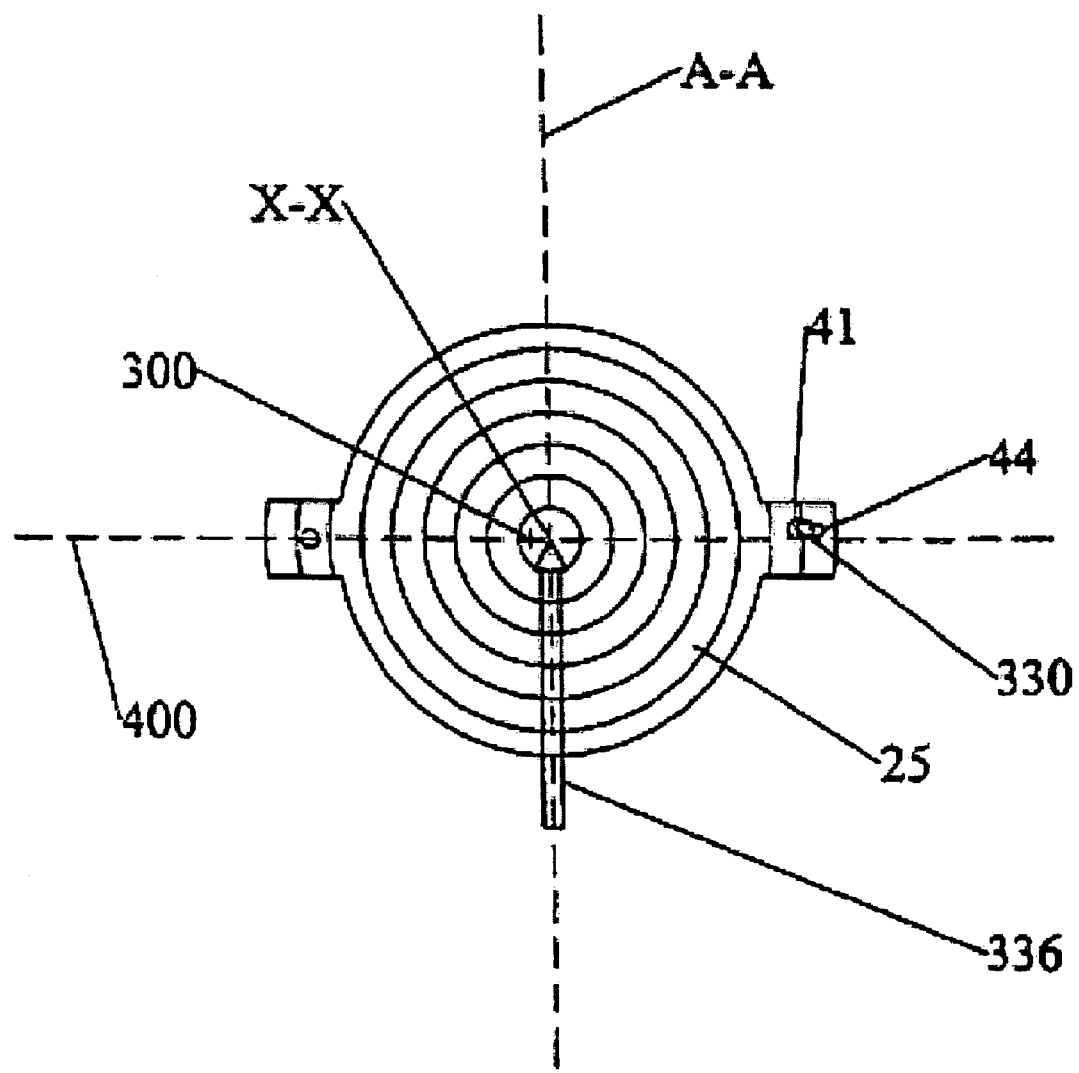
FIG. 29 is a front elevation of one of the floatation members as shown in FIG. 14 schematically illustrating the forces acting thereon when in a first balanced position.
Figures 30, 30A:
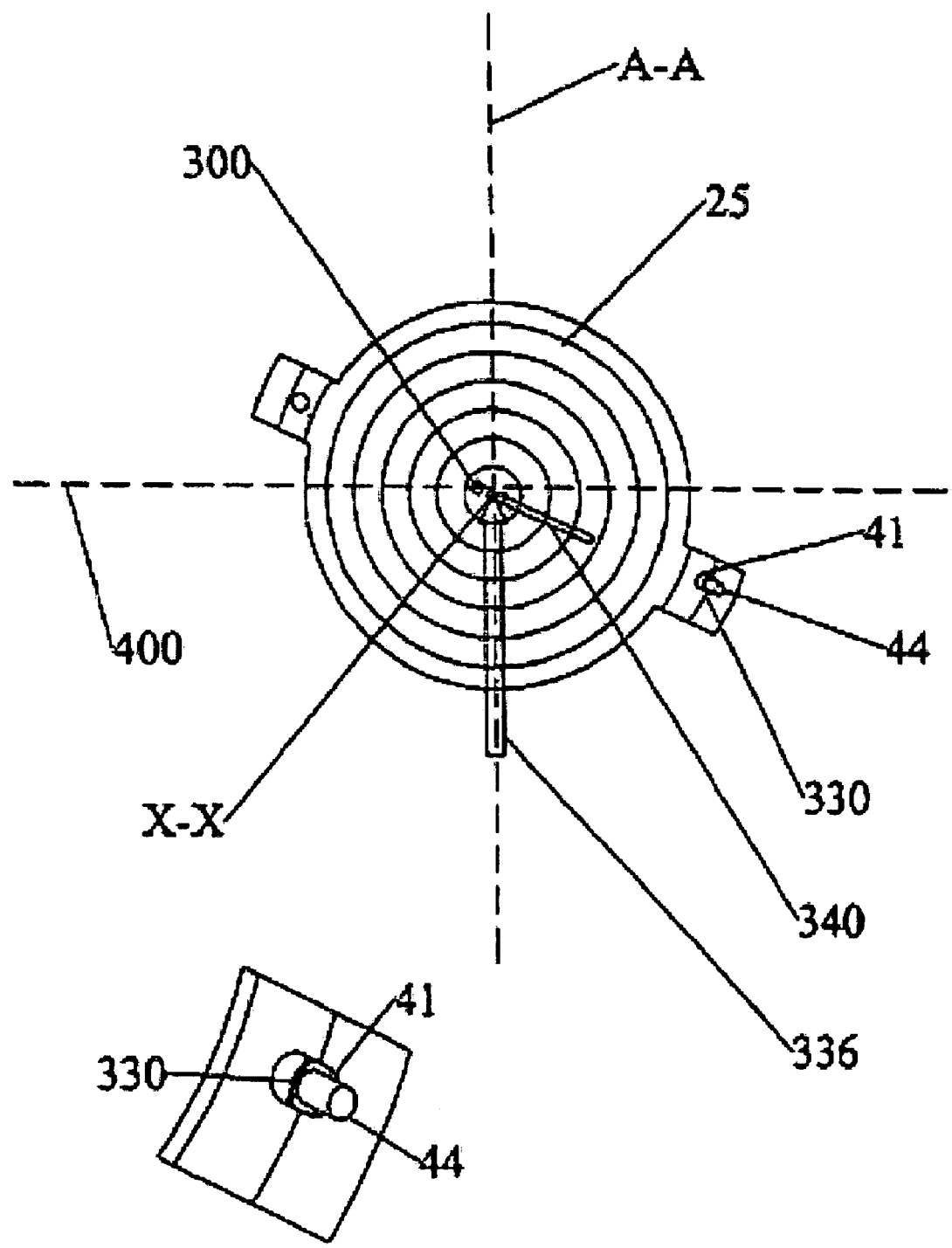
FIG. 30 is a front elevation of the floatation member of FIG. 29 schematically illustrating the forces exerted thereon when displaced out of a balanced position.
FIG. 30a is an enlarged view of a tab of the floatation member shown in FIG. 30.

Referring now to FIGS. 29 and 30, the schematic forces applied to the floatation members (25, 26, 30) are now illustrated. As previously discussed, the floatation member (25) is eccentrically mounted about an eccentric pivot axis (300) which is radially remote from the central axis (x-x) of such cylinder which provides a centre of buoyancy of such cylinder. When the two tabs (41) are horizontally aligned on a horizontal plane (400), a moment is created on the cylinder (25) due to the resultant buoyancy or upthrust exerted on this container by the liquid within the apparatus substantially indicated by arrow (336). This upthrust seeks to return the cylinder to an equilibrium position whereby the axis (x-x) of the cylinder would lie vertically above the pivot axis (300).

However, in the position shown, the peg (44) engages with the elongate slot (41) of the tab (40) to provide a counter balancing force maintaining the cylinder in this displaced configuration. Here, a resultant rotational force is applied by the peg (44) to the cylinder so as to counter balance the resultant upthrust (336) and thus maintain equilibrium. This rotational force applied to the pegs (44) is achieved by appropriate manipulation of the ring gear as previously mentioned. Since the upthrust (336) is equal and opposite to the resultant rotational displacement force exerted by the peg (44) on the cylinder (25) there is no resultant force to apply any horizontal force component on the cylinder (25). In this manner the apparatus is operating in a manner similar to the apparatus of the first embodiment as shown in its stable configuration in FIG. 9.

Referring now to FIG. 30, on activation of the hydraulic mechanism to further lower the ring gear (49), a downward force will be applied on the peg (44) and transmitted to the elongate slot (41) effecting rotational displacement of the floatation member (25) about its eccentric pivot axis (300). Again, due to the relative distance of the peg (44) engaged with the slot (41) relative to the axis (300), an appropriate moment is created whereby the force required to overcome the buoyancy of the floatation member (25) is less than the upthrust, due to the mechanical advantage or moment achieved by this distance. Since the peg (44) merely engages a flat surface of the elongate slot (41) and not an end thereof, then the downward force applied to this peg (44) is transmitted perpendicularly to this elongate slot (41) thereby creating a pivotal displacement force (330) (FIG. 30a) similar to the pivotal displacement force (230) described with reference to FIGS. 1 through 10. Again, an upthrust is created as a result of the displaced fluid and is schematically indicated by arrow (336) in FIG. 30 again in a similar manner to that described with reference to FIGS. 1 through 10. As for the first example, the resultant resolution of this pivotal displacement force (330) and the upthrust (336), is a resultant force vector (340) which is transmitted through the pivot axis (300) of this floatation member (25) (and thus one of the pin (10)) to effect a rotational force transmitted to the main drive shaft (1) which will effect rotation of that main drive shaft (1) about its axis (A). In the embodiment described herein, each of the three floatation members (25, 26, 30) will be effected simultaneously in a similar manner so that the rotational drive force exerted on the drive shaft (1) will be magnified threefold.

As for the first embodiment, again it is an important feature of the present invention that the pivotal displacement force (330) must be maintained perpendicular to the elongate slot (41) (which slot performing a similar function as the lever member (224) of the first embodiment) and for this reason, the pegs (44, 45, 46) are mounted on a drive gear (49) which itself is rotatable within the apparatus through engagement with the rotatable drive gears (65, 66, 67). These drive gears are connected to an appropriate external drive mechanism (not shown, but could include a simple motor or other manually displaceable mechanism to effect rotation of the drive gears (65, 66, 67)) whereby the rotation of such drive gears (65, 66, 67) causes meshed engagement between the teeth of such drive gears (65, 66, 67) and the teeth (50) of the ring gear (49) so as to effect rotation of this ring gear (49) coaxially about the drive shaft (1). Thus, as a rotational displacement force is transmitted to cause the drive shaft (1) to rotate about its axis (A), the floatation members (25, 26, 30) themselves are also rotated about axis (A) and so the ring gear (49) is appropriately driven to ensure that the pegs (44, 45, 46) are retained in contact with the central portion of the elongate slots (41) so as to maintain the appropriate angle of displacement of the slot (41) relative to the horizontal plane, and secondly, to ensure that the pegs (44, 45, 46) do not engage with an end portion of the slot (41) which could create an additional translational reaction force which could counter the resolved drive force. It is important that the speed of rotation of the ring gear (49) be consistent with the speed of rotation of the drive shaft (1) caused by the resolved upthrust. In this manner, the pegs (44, 45, 46) are maintained substantially within the centre of the elongate slots (41) so as not to abut or engage the end surfaces of such slots (41). Should the pegs (44, 45, 46) abut the end surfaces of such slots (41), then additional translational forces will be applied to the floatation members (25, 26, 30) providing at least one force vector countering the resultant force (340) achieved by the upthrust.

As for the first embodiment, drive control of the apparatus can be varied by adjusting the relative angle of between the elongate slot (41) and a horizontal plane (400) as shown in FIG. 29, such that again the greater this angle then the greater the size of the resultant vector which increases the speed of rotation of the drive shaft (1). If the speed of rotation of the drive shaft (1) increases then adjustment of the speed of rotation of the ring gear (49) is also required to maintain the peg (44) in the centre of the elongate slot (41) so as to maintain the pivotal displacement force perpendicular thereto. In addition, it will also be appreciated that the further the slot (41) is from the pivot axis (300) of the floatation members (25) then the greater the mechanical advantage can be achieved. Whilst the pivotal displacement force is achieved hydraulically, it is still advantageous to minimise the required pivotal displacement force so as to minimise frictional resistance between the ring gear (49) and the ring gear guides (51, 52, 53). Hence, the smaller the pivotal displacement force the smaller the frictional resistance and thus the efficiency of the apparatus is further increased.

The second embodiment thus utilises the buoyancy upthrust force exerted on a floatation member (25, 26, 30) disposed past an equilibrium position to create a resultant drive force through the pivot axis of the floatation member (25, 26, 30) which, in this embodiment, is used to effect rotational displacement of a drive shaft (1) about a substantially vertical axis (A). Rotation of this drive shaft (1), and specifically its external key way (8), can then be used as a rotary output for driving other apparatus such as a gear mechanism, wheels or other mechanical devices. Similarly, it can be connected to an appropriate gear mechanism for converting rotary to linear motion to effect a linear drive member.

It is to be appreciated that this apparatus provides a means of utilising a buoyancy upthrust force on a floatation member (25, 26, 30) to assist in effecting non-vertical displacement of an article such as a drive shaft (1) (or a rotary drum according to the first embodiment). Since energy input is required to maintain the pivotal displacement force perpendicular to either the lever member (224) or the elongate slot (41) of the second embodiment it will be appreciated that the output or resultant force is not dependent solely on the buoyancy force but also requires a certain energy input to maintain the pivotal displacement force perpendicular to the appropriate displacement lever, but the upthrust created is used to significantly enhance the energy output of the apparatus.

The foregoing embodiments of the present invention are by way of example only and not limiting on the scope of the protection sought by this patent. For example, in the second embodiment whilst it is preferred to utilise hydraulic drive to adjust the displacement of the pegs (44, 45, 46) and hence effect rotational displacement of the floatation members (25, 26, 30), this can be achieved in a number of ways, varying from mechanical through to electrical displacement forces. Also, the use of the ring gear (49) as specified herein also allows adjustment of the angle of rotational displacement of floatation members (25, 26, 30) which has advantages as previously described. Furthermore, it is to be appreciated that the two embodiments described herein utilise contained fluid medium within either the cylinder (210) of the embodiment shown in FIG. 1 or within the cylindrical outer wall (95) of the apparatus of the second embodiment as shown in FIG. 27. The provision of such a contained fluid medium is for ease of manoeuvrability and operation of the current invention remote from a permanent water source. However, it is perfectly feasible that the invention is equally applicable in a scenario whereby the fluid medium is not contained within the apparatus but the apparatus it itself completely or partially immersed in the fluid medium. For example, both the devices shown in the described embodiment will work equally as well if placed within a non-contained water source such as a pool, river or ocean. In the embodiment shown in FIG. 1, the end plates (212) could simply be omitted and the apparatus completely or partially submerged within an appropriate liquid such as a river. Whereby such liquid will again cause the floatation member to seek an equilibrium position in a manner similar to that described for the embodiment shown in FIG. 1 whereby the fluid medium is wholly contained within the cylindrical drum. Similarly, for the second embodiment, the cylindrical outer wall (95) can simply be omitted and the device again completely or partially submerged in an appropriate liquid such as water or oil.

What is claimed is:

1. Apparatus for utilising the buoyancy upthrust on a floatation member to assist displacement of a moveable article in a non-vertical direction, said apparatus comprising at least one pivotally mounted floatation member at least partially immersed in a fluid medium and a displaceable actuator member integrally connected to said floatation member, wherein said floatation member is integrally mounted on said moveable article about a pivot axis extending therefrom, said floatation member being pivotally displaceable about said pivot axis into said fluid medium and past an equilibrium position by application of a pivotal displacement force applied to said actuator member so as to create a buoyancy upthrust on said floatation member, wherein means are provided to apply and maintain said pivotal displacement force in a direction perpendicular to said actuator member thereby creating a resultant force vector from said buoyancy upthrust on said floatation member which extends perpendicularly through said pivot axis and is transmittable to said article to effect displacement of such article, the apparatus further comprising a displaceable force transmission member for effecting displacement of said pivotal displacement force so as to maintain such pivotal displacement force constant with respect to and perpendicular with said displaceable actuator member during displacement of said article and wherein said force transmission member is driven.

2. Apparatus as claimed in claim 1 further comprising a sealed body for containing said fluid medium in which said floatation member is at least partially immersed.

3. Apparatus as claimed in claim 1 wherein said actuator member is radially remote from said pivot axis so as to achieve a mechanical advantage through the application of said pivotal displacement force thereto.

4. Apparatus as claimed in claim 1 wherein said actuator member comprises a lever mechanism.

5. Apparatus as claimed in claim 1 wherein said lever mechanism is co-axially mounted with said floatation member about said pivot axis.

6. Apparatus as claimed in claim 1 wherein said force transmission member is motor driven.

7. Apparatus as claimed in claim 1 wherein said article is rotatable.

8. Apparatus as claimed in claim 7 wherein said article is rotatable about an axis co-axial with said pivot axis.

9. Apparatus as claimed in claim 8 wherein said article is displaceable laterally relative to a direction of said buoyancy upthrust.

10. Apparatus as claimed in claim 8 wherein said article comprises a cylindrical drum encompassing said fluid medium and said floatation device and which drum extending co-axial with said pivot axis.

11. Apparatus as claimed in claim 7 wherein said article is rotatable about an article axis perpendicular to said pivot axis.

12. Apparatus as claimed in claim 11 having an external drive mechanism connected to and operated by said rotatable article.

13. Apparatus as claimed in claim 11 wherein said force transmission member is motor driven and said displaceable force transmission member extends co-axially with said article axis.

14. Apparatus as claimed in claim 11 comprising a plurality of floatation members radially disposed about and pivotally connected to said article axis.

15. Apparatus as claimed in claim 14 wherein said force transmitting member comprises a circular device mounted co-axially with said article axis so as to maintain the pivotal displacement force applied to each of said plurality of floatation members constant with respect to and perpendicular with each displaceable actuator member associated therewith.

16. A method of utilising the buoyancy upthrust on a floatation member to assist displacement of a moveable article in a non-vertical direction comprising the steps of:
connecting a pivotally displaceable floatation member to said article about a pivot axis of said floatation member,
applying a pivotal displacement force to an actuator member of said floatation member in a direction perpendicular to said actuator member so as to effect pivotal displacement of said floatation member into a fluid medium past an equilibrium position,
maintaining said displacement force perpendicular to said actuator member to create a resultant force vector from said buoyancy upthrust on said floatation member which is transmitted perpendicularly through said pivot axis to said article to effect displacement of such article,
using a force transmission member to effect displacement of said pivotal displacement force so as to maintain such pivotal displacement force constant with respect to and perpendicular with said actuator member during displacement of said article, and driving said force transmission member.

17. A method as claimed in claim 16 further comprising providing said actuator with a predetermined length and wherein said application of said pivotal displacement force is effected remote from the pivot axis at a predetermined distance from said pivot axis to provide a predetermined mechanical advantage allowing a smaller force than the resultant upthrust to effect the displacement of the floatation member past its equilibrium position.

18. A method as claimed in claim 16 comprising adjusting the resultant force vector transmitted to the article by adjusting the angle between the point of application of the pivotal displacement force to the actuator member relative to a horizontal plane intersecting said pivot axis.

19. A method as claimed in claim 18 comprising increasing said resultant force vector by increasing said angle.

20. A wheeled vehicle having at least one wheel comprising an apparatus as claimed in claim 1.

21. An engine comprising an apparatus as claimed in claim 11.

22. Apparatus for assisting displacement of a moveable article in a non-vertical direction, said apparatus comprising at least one pivotally mounted floatation member at least partially immersed in a fluid medium and a displaceable actuator member connected to said floatation member, wherein said floatation member is mounted on said moveable article about a pivot axis extending therefrom, said floatation member being displaceable about said pivot axis past an equilibrium position by application of a pivotal displacement force to said actuator member so as to create a buoyancy upthrust on said floatation member, wherein means are provided to apply said pivotal displacement force to said actuator member, the displacement force and the buoyant upthrust creating a resultant force on said floatation member which extends through said pivot axis and is transmittable to said article to effect displacement of the article, the apparatus further comprising a displaceable force transmission member for effecting displacement of said pivotal displacement force so as to maintain such pivotal displacement force constant with respect to and perpendicular with said displaceable actuator member during displacement of said article and wherein said force transmission member is driven.

23. Apparatus for utilising the buoyancy upthrust on a floatation member to assist displacement of a moveable article in a non-vertical direction, said apparatus comprising at least one pivotally mounted floatation member at least partially immersed in a fluid medium and a displaceable actuator member integrally connected to said floatation member, wherein said floatation member is integrally mounted on said moveable article about a pivot axis extending therefrom, said floatation member being pivotally displaceable about said pivot axis into said fluid medium and past an equilibrium position by application of a pivotal displacement force applied to said actuator member so as to create a buoyancy upthrust on said floatation member, wherein a displaceable force transmitter to be held by a user is provided to apply and maintain said pivotal displacement force in a direction perpendicular to said actuator member thereby creating a resultant force vector from said buoyancy upthrust on said floatation member which extends perpendicularly through said pivot axis and is transmittable to said article to effect displacement of such article, wherein the displaceable force transmitter comprises a displaceable force transmission member for effecting displacement of said pivotal displacement force so as to maintain such pivotal displacement force constant with respect to and perpendicular with said displaceable actuator member during displacement of said article and wherein said force transmission member is driven.

24. An apparatus according to claim 23 wherein the displaceable force transmitter comprises a wheel.

25. Apparatus for utilising the buoyancy upthrust on a floatation member to assist displacement of a moveable article in a non-vertical direction, said apparatus comprising at least one pivotally mounted floatation member at least partially immersed in a fluid medium and a displaceable actuator member integrally connected to said floatation member, wherein said floatation member is integrally mounted on said moveable article about a pivot axis extending therefrom, said floatation member being pivotally displaceable about said pivot axis into said fluid medium and past an equilibrium position by application of a pivotal displacement force applied to said actuator member so as to create a buoyancy upthrust on said floatation member, wherein a displaceable force transmitter is provided to apply and maintain said pivotal displacement force in a direction perpendicular to said actuator member thereby creating a resultant force vector from said buoyancy upthrust on said floatation member which extends perpendicularly through said pivot axis and is transmittable to said article to effect displacement of such article, wherein the displaceable force transmitter comprises a displaceable force transmission member for effecting displacement of said pivotal displacement force so as to maintain such pivotal displacement force constant with respect to and perpendicular with said displaceable actuator member during displacement of said article.

26. An apparatus according to claim 25 wherein the displaceable force transmitter comprises a ring gear.

* * * * *

UNITED STATES PATENT AND TRADEMARK OFFICE
CERTIFICATE OF CORRECTION

| | | |
|---|---|---|
| PATENT NO. | : 7,056,176 B2 | Page 1 of 1 |
| APPLICATION NO. | : 11/111407 | |
| DATED | : June 6, 2006 | |
| INVENTOR(S) | : Felix Isaac | |

It is certified that error appears in the above-identified patent and that said Letters Patent is hereby corrected as shown below:

Title Page should read

(30) Foreign Application Priority Data
Oct. 21, 2002 (GB) ............... 0224464.8
Nov.  4, 2002 (GB) ............... 0225684.0
June  5, 2003 (GB) ............... 0312948.3

Signed and Sealed this

Nineteenth Day of September, 2006

JON W. DUDAS
*Director of the United States Patent and Trademark Office*